United States Patent
Iampietro et al.

(10) Patent No.: US 8,200,669 B1
(45) Date of Patent: Jun. 12, 2012

(54) MANAGEMENT OF SMART TAGS VIA HIERARCHY

(75) Inventors: Michael Iampietro, San Francisco, CA (US); Abhinav Darbari, Uttar Pradesh (IN); Ramesh P B, Uttar Pradesh (IN); Ram Narain Yadav, Uttar Pradesh (IN); Arvinder Singh, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 912 days.

(21) Appl. No.: 12/196,101

(22) Filed: Aug. 21, 2008

(51) Int. Cl.
*G06F 7/00* (2006.01)
*G06F 17/30* (2006.01)

(52) U.S. Cl. ......... 707/737; 707/741; 707/914; 707/915

(58) Field of Classification Search .................. 707/705, 707/736, 737, 738, 739, 740, 741, 722
See application file for complete search history.

(56) References Cited

U.S. PATENT DOCUMENTS

| | | | | |
|---|---|---|---|---|
| 5,754,939 | A * | 5/1998 | Herz et al. | 455/3.04 |
| 5,819,258 | A * | 10/1998 | Vaithyanathan et al. | 707/692 |
| 6,285,995 | B1 * | 9/2001 | Abdel-Mottaleb et al. | 707/737 |
| 6,408,301 | B1 * | 6/2002 | Patton et al. | 707/741 |
| 6,629,104 | B1 * | 9/2003 | Parulski et al. | 382/307 |
| 7,010,144 | B1 * | 3/2006 | Davis et al. | 382/100 |
| 7,162,488 | B2 * | 1/2007 | DeVorchik et al. | 707/102 |
| 7,706,004 | B2 * | 4/2010 | Prakash | 358/1.14 |
| 7,719,574 | B2 * | 5/2010 | Nakami et al. | 348/221.1 |
| 2005/0044112 | A1 * | 2/2005 | Yamamoto et al. | 707/104.1 |
| 2006/0253491 | A1 * | 11/2006 | Gokturk et al. | 707/104.1 |
| 2007/0282908 | A1 * | 12/2007 | Van der Meulen et al. | 707/104.1 |
| 2008/0301583 | A1 * | 12/2008 | Akagi | 715/838 |
| 2009/0216806 | A1 * | 8/2009 | Feuerstein et al. | 707/104.1 |
| 2010/0287161 | A1 | 11/2010 | Naqvi | |

* cited by examiner

*Primary Examiner* — Marc Somers
(74) *Attorney, Agent, or Firm* — Kilpatrick Townsend & Stockton LLP

(57) ABSTRACT

Embodiments herein include presenting smart tags describing characteristics of image content in a hierarchy, and performing operations on the hierarchy to find particular image content within a larger amount of image content. Image content and corresponding tags are maintained. The corresponding tags associated with the image content are presented in a hierarchy. Each tag type in the hierarchy represents a characteristic associated with the image content. Each tag in the hierarchy is derived based on image-based processing applied to the image content. In response to receiving a selection of at least one tag in the hierarchy, display of the image content associated with the at least one tag is initiated. A user is able to quickly and easily find desired image content by using the hierarchy to look at tags, select a type of tag from the hierarchy, and thereafter view any content tagged with the selected tag type.

30 Claims, 16 Drawing Sheets

MANAGEMENT OF SMART TAGS VIA HIERARCHY

CROSS REFERENCE TO RELATED APPLICATIONS

This Patent Application is related to co-pending U.S. patent application Ser. No. 12/196,127, entitled "GENERATION OF SMART TAGS TO LOCATE ELEMENTS OF CONTENT" and filed on Aug. 21, 2008, the contents and teachings of which are hereby incorporated by reference in their entirety.

BACKGROUND

Users take more photographs, audio, and video with digital cameras and camcorders (as well as cell phones) now than ever before. In the past, the primary disadvantage to acquiring large amounts of digital content was a lack of inexpensive storage devices available, particularly if a user acquired the content in a high resolution format. Advances in storage technology have resulted in greater amounts of storage being sold at a lower cost, such that it is now possible to purchase many gigabits of storage for a few hundred dollars, sometimes less. Now, the opposite situation has emerged, where most users of digital devices have so much acquired content, it is hard for them to easily organize and make sense of it all.

A number of software applications are available that allow a user to preview and navigate their digital content wherever that content may be stored, and then edit it, share it, and produce the content in a variety of ways. Even operating systems, such as the Microsoft® Windows® family of operating systems, include an automatic preview of a folder containing digital images by providing thumbnails of some of the images contained within a folder. Other applications may create previews in their own particular ways, such as showing a number of condensed-sized thumbnails of digital images, a short clip of a longer video file, or a short clip of a longer audio file.

Operating systems, such as Microsoft® Vista®, as well as digital content acquisition applications that come bundled with a digital camera/camcorder, such as Olympus® X®, or is freely available, such as Picasa® by Google®, allow a user to identify elements of digital content when a user downloads that content from a source (i.e., a digital camera, cameraphone, digital camcorder or other video recorder, memory device located in a digital device, and so on) to a computer. This is a manual process that involves the user typing, or otherwise providing, the descriptive information to the application. These applications thus allow a user to preview and search through digital content. Some information about the digital content may be produced by the capturing device itself, and is then acquired by the application. For example, a digital camera may encode, within a digital image captured by the camera, the type of camera used to capture the image, as well as the time and date on which the image was captured, the size of the image in bytes, the settings used by the camera when capturing the image, and so on.

SUMMARY

Conventional mechanisms for finding digital content in a large library of digital content suffer from a variety of deficiencies. One such deficiency is that searching for a desired portion of content is a manual process that may take a substantial amount of time to review. In some cases, when a user is looking for a piece of content among a few pieces of such content (e.g., a photograph of the user and his brother from among twenty photographs), the user simply views each of the twenty photographs until he finds the one he wants. Similarly, when the desired portion of content may be described simply, such as a video from a particular date, a manual search process, either of manually viewing the recording dates of all videos or using a search function to find videos from a particular date, is reasonably straightforward and involves little time on the part of the user. However, when the desired portion of content is a complex event, such as a particular group of people together in a video or image at, say, a particular birthday party, and especially when the library of available content is large, the manual search process may be long and tedious. A user would first have to identify all content that might include the particular birthday party, either by viewing all of the available content or through other mechanisms. The user will then have to manually go through every image, or every frame of video, to find those images/portions of video that include all the people in the desired group. This is an efficient, time-consuming process that requires the user to manually review at least some of the content in order to complete the search.

Embodiments of the invention significantly overcome such deficiencies and provide mechanisms and techniques that allow for quick and easy searches of libraries of digital content, even when the search is for a complex event, without ever having to look at any of the content.

For example, certain embodiments herein include presenting tags, for selected content, which describe various events in the content. The tags may be presented in a hierarchical format, such as a tree.

The tags in the hierarchical tree may be grouped according to related characteristics, such as scenes, face detection, and so on. Thus, for example, there may be a number associated with each of one or more tags to indicate the number of faces present in an image or frame; other tags may indicate the presence of a particular face in an image or a frame. Such tags may be grouped into a face detection group, with various subgroups in the hierarchy (i.e., one face, two face, Jane's face, Tom's face, etc.).

In further embodiments, tags may also be grouped into groups representative of characteristics of the content itself, such as a motion group, with subgroups including pan, tilt, zoom, and further subgroups such as tilt up, tilt down, and so on.

According to one embodiment herein, the hierarchical tree may be navigable. For example, a user may drill down and expand levels of the hierarchical tree to view respective subgroups, or may look only at top-level groups.

Based on navigating amongst the tree, a user is then able to select one or more tags that define an event of interest to the user, with the result being that all content associated with those selected tag(s) is found and displayed to the user. Thus, if a user desires to find all occurrences of Jane's face in nine distinct video files, the user simply selects the tag corresponding to the presence of Jane's face in content, and all portions of the nine video files in which Jane's face appears are shown to the user. The user does not have to look through videos or images, or manually parse any search results, to find the desired content. If the user wishes to find Jane's face from a particular event, such as her last birthday party, the user simply selects all the relevant tags within the hierarchy, and again, the appropriate content is found and displayed to the user without having to view any of the content.

As will be discussed later in this specification, the search may be multi-level. For example, a first portion of the search may include selecting a tag type indicating a presence of Jane's face. A search process identifies any portions of the content tagged with the selected tag. A subsequent level of the search may include identifying which portions of content tagged with Jane's face are also tagged with a tag type indicating that the image is related to a birthday.

More particularly, in one embodiment, there is provided a method. The method includes maintaining image content and corresponding tags. Image content as described herein may be any digital content that includes at least one image, either a static image (i.e., photograph) or a dynamic set of images (i.e., video), and may include other non-image content (e.g., audio, text, etc.).

The method as described herein may include presenting the corresponding tags associated with the image content in a hierarchy, each tag type in the hierarchy representing a characteristic associated with the image content, each tag in the hierarchy being derived based on image-based processing applied to the image content. As mentioned above, the hierarchy may be a tree format, with top level groups and sub-groups located underneath. A tag in the tree may identify one or more occurrences that are present in the image content, and the location(s) of those occurrences.

In response to receiving a selection of at least one tag in the hierarchy, the method also includes initiating display of the image content associated with the at least one tag. Thus, for a user to find some particular occurrence, or combination of occurrences, within the image content, such as a group of people standing outside, the user need only simply select the appropriate tags (e.g., "3 or more people" and "outside") in the hierarchy, and the relevant image content is automatically shown to the user.

In a related embodiment, the method may include filtering tags in the hierarchy into a sub-group of related tags, wherein the sub-group of related tags includes a first type of tags and a second type of tags. The method may also include receiving a selection of the sub-group of related tags, and in response to receiving the selection, initiating display of image content tagged with the first type of tags and the second type of tags.

In another related embodiment, the method may include searching the hierarchy of tags to find tags indicating at least one event of interest captured by the image content. A search may be initiated by a user, and may be performed in any known way. The hierarchy may contain all of the necessary information at each top-level and sub-level grouping of tags to allow searching within any particular level or group of tags. Upon finding a group of tags indicating the at least one event of interest, the method may also include automatically selecting the group of tags and corresponding portions of the image content tagged with the group of tags.

In yet another related embodiment, maintaining the corresponding tags may include maintaining metadata information associated with the corresponding tags, the metadata information defining attributes of the image content tagged with the corresponding tags. The method may further include receiving event information defining a particular type of event of interest. Thus, an event of interest may be defined by a user and provided to embodiments in order to search. The method may also include performing a search with respect to the metadata information associated with the corresponding tags to locate portions of the image content in which the particular type of event of interest occurs for image content tagged with the corresponding tags, and in response to the search, displaying the portions of the image content in which the particular type of event of interest occurs in the image content.

In still yet another related embodiment, maintaining may further include maintaining video content including multiple frames of images and tags indicating frames of the video in which different events occur, and receiving may include receiving selection of a particular type of tag from the hierarchy. Initiating display may include searching for frames of the video tagged with the particular type of tag, and initiating display of the frames of the video tagged with the particular type of tag. Thus, a user is able to find portions of video that include events of interest by selecting a particular type of tag within the hierarchy of tags.

In yet another related embodiment, maintaining may include receiving metadata values associated with portions of the image content tagged with the corresponding tags, and associating the metadata values with the corresponding tags. The metadata values may be discovered through image-based processing, such as the blurriness/focus level, brightness, contrast, color balance, and so on. Numeric values representing any of these are stored within the tags as metadata. More particularly, in a further related embodiment, the method may include searching within groups of the hierarchy of tags to find tags within a particular group that represent a range of values that describe an event of interest present in the image content associated with the tags, upon finding such tags, selecting the found tags and displaying the image content associated with the found tags. Thus, if a user desired to find all portion of image content where the image was slightly out of focus, the user simply performs a search for the corresponding range of values representing slightly out of focus images on the hierarchy. The user need not see any of the image content in order to find the portions that are out of focus according to the defined range:

In still another related embodiment, the method may include, prior to presenting tags, receiving, for each tag within a plurality of tags associated with the image content, analysis data descriptive of a parameter of a portion of the image content associated with that tag. This may be the same analysis data used as the metadata described above, or may be supplemental analysis determined from image-based processing techniques or other evaluation techniques. The method may also include, prior to presenting tags, deriving quality tags from an evaluation of combinations of the parameters described by the analysis data, a quality tag representing a portion of image content associated with a subset of the plurality of tags, each quality tag describing a quality level of the represented image content. Thus, a quality tag identifies whether a portion of image content is, for example, of high quality (i.e., no blurriness, proper focus level, proper color adjustments, etc.), medium quality (i.e., slightly blurry but not indecipherable, color levels slightly off, etc.), or low quality (i.e., so blurry the image content is useless to the user, color levels not representative of the actual event the image content was to capture, etc.). Presenting tags may then include presenting tags associated with the image content and the quality tags in a hierarchy, each tag in the hierarchy describing a characteristic of a portion of the image content, each tag being derived based on image-based processing applied to the image content. Thus, a user would be able to find all high quality image content including four people by simply selecting the corresponding tags in the hierarchy, and without viewing any of the content. In a further related embodiment, initiating display may include, in response to receiving a selection of a quality tag and at least one other tag, initiating presentation of a portion of image content that satisfies the quality level associated with the quality tag and includes characteristics described by the at least one other tag.

In yet still another related embodiment, initiating display may include, in response to receiving a selection of at least one tag in the hierarchy, presenting each portion of image content associated with the at least one tag, in response to receiving a selection of a presented portion of image content, initiating playback of the selected portion of image content, and upon completion of playback of the selected portion of image content, initiating playback of a successive presented portion of image content.

In still yet another related embodiment, presenting may further include initiating display of the hierarchy to multiple levels, a first tag level of the hierarchy representing tags of a particular type, and initiating display of multiple tag sub-levels beneath the first tag level in the hierarchy, the multiple sub-levels including a first tag sub-level and a second tag sub-level, the first tag sub-level representing a first type of tags of the particular type, the second tag sub-level representing a second type of tags of the particular type. Thus, a motion tag may be a first tag level of the hierarchy, and under it as sub-level tags may be a pan tag, a zoom tag, and a tilt tag. The pan tag sub-level includes all pan-type tags (i.e., pan left, pan right, etc.); the zoom tag sublevel includes all zoom-type tags (i.e., zoom in, zoom out, etc.); the tilt tag sub-level includes all tilt-type tags (i.e., tilt up, tilt down, etc.). All pan-type tags, zoom-type tags, and tilt-type tags are also motion-type tags. In a further related embodiment, the method may further include, responsive to selection of the first tag level, initiating display of portions of the image content tagged with the first type of tags and the second types of tags, and responsive to selection of the first tag sub-level beneath the first tag level, initiating display of portions of the image content tagged with the first type of tags, and responsive to selection of the second tag sub-level, initiating display of portions of the image content tagged with the second type of tags. Thus, if a user selects the motion tag, image content tagged with any pan-type tags, any zoom-type tags, and any tilt-type tags is shown. If the user selects only the pan tag, then only image content tagged with pan-type tags, and not with zoom-type tags or tilt-type tags, is shown. If the next tag level below motion tag is a faces tag, then only image content tagged with a faces-type tag is shown.

In yet still another related embodiment, presenting may include initiating display of a respective tag associated with the image content, receiving selection of the respective tag, and in response to the selection of the respective tag, initiating display of metadata information associated with the respective tag. This metadata information may be information that informs a user of why the respective tag was generated. In still another related embodiment, the method may further include initiating display of metadata information including at least one parameter value that triggered generation of the respective tag to be created, and initiating display of additional metadata information including at least one parameter value that did not trigger generation of the respective tag.

In another embodiment, there is provided a computer program product including a computer-storage medium having instructions stored thereon for processing data information. The instructions, when carried out by a processing device, enable the processing device to perform operations of maintaining image content and corresponding tags; presenting the corresponding tags associated with the image content in a hierarchy, each tag type in the hierarchy representing a characteristic associated with the image content, each tag in the hierarchy being derived based on image-based processing applied to the image content; and in response to receiving a selection of at least one tag in the hierarchy, initiating display of the image content associated with the at least one tag.

In another embodiment, there is provided a computer system to carry out the methods as discussed above and below. In an example embodiment, the computer system may include a processor, a memory unit that stores instructions associated with an application executed by the processor, a display, and an interconnect coupling the processor, the memory unit, and the display, enabling the computer system to execute the application and perform operations of: maintaining image content and corresponding tags; presenting the corresponding tags associated with the image content in a hierarchy, each tag type in the hierarchy representing a characteristic associated with the image content, each tag in the hierarchy being derived based on image-based processing applied to the image content; and in response to receiving a selection of at least one tag in the hierarchy, initiating display of the image content associated with the at least one tag.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing client management of download sequence of orchestrated content as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC) or as downloadable software images in one or more modules, shared libraries, etc. The software or firmware or other such configurations may be installed onto a computerized device to cause one or more processors in the computerized device to perform the techniques explained herein as embodiments of the invention. Software processes that operate in a collection of computerized devices, such as in a group of data communications devices or other entities may also provide the system of the invention. The system of the invention may be distributed between many software processes on several data communications devices, or all processes could run on a small set of dedicated computers, or on one computer alone.

It is to be understood that embodiments of the invention may be embodied strictly as a software program, as software and hardware, or as hardware and/or circuitry alone, such as within a data communications device. The features disclosed and explained herein may be employed in data communications devices and other computerized devices and software systems for such devices such as those manufactured by Adobe Systems Incorporated, of San Jose, Calif.

Note that each of the different features, techniques, configurations, etc. discussed in this disclosure may be executed independently or in combination. Accordingly, the present invention may be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Generally, disclosed embodiments provide techniques for presenting tags associated with image content in a hierarchy, and finding image content using those tags without having to manually view any of the image content. In an example embodiment, the tags are generated based on analyzing elements such as pixels associated with image content to create a set of different types of tags. Thereafter, a display manager initiates display of the different tags in a hierarchical tree. Upon selection of one or more tags in the hierarchical tree, a user may initiate display of particular portions of the image content having characteristics as specified by the selected one or more tags in the hierarchical tree.

Figure 1:
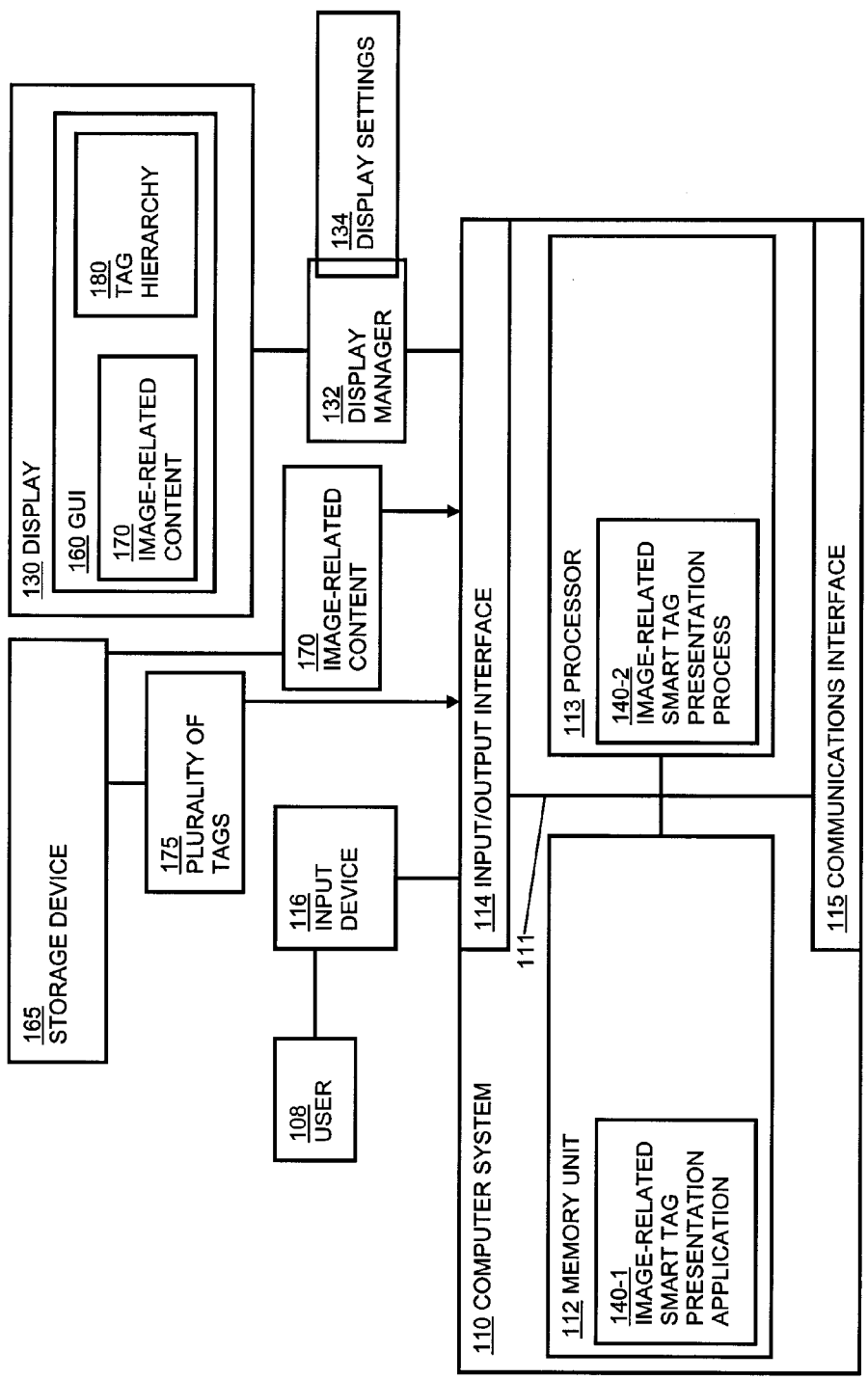
FIG. 1 shows a high-level block diagram of a computer system that displays a hierarchy of smart tags for finding occurrences within image content according to embodiments described herein.

More particularly, FIG. 1 is a block diagram illustrating example architecture of a computer system 110 that executes, runs, interprets, operates or otherwise performs an image-related smart tag presentation application 140-1 and an image-related smart tag presentation process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnect 111 such as a data bus or other circuitry that couples a memory unit 112, a processor 113, an input/output interface 114, and a communications interface 115. An input device 116 (e.g., one or more user controlled devices such as a keyboard, mouse, touchpad, trackball, etc.) couples to the processor 113 through the I/O interface 114 and enables a user 108, such as a person searching for particular occurrences in image content, to provide input commands and generally control a graphical user interface 160 shown on a display 130, as described further herein. The communications interface 115 enables the computer system 110 to communicate with other devices (e.g., other computers) on a network (not shown in FIG. 1).

The memory unit 112 is any type of computer readable medium and in this example is encoded with an image-related smart tag presentation application 140-1. The image-related smart tag presentation application 140-1 may be embodied as software code such as data and/or logic instructions (e.g., code stored in the memory unit or on another computer readable medium such as a removable disk) that supports processing functionality according to different embodiments described herein. During operation of the computer system 110, the processor 113 accesses the memory unit 112 via the interconnect mechanism 111 in order to launch, run, execute, interpret or otherwise perform the logic instructions of the image-related smart tag presentation application 140-1. Execution of the image-related smart tag presentation application 140-1 in this manner produces processing functionality in an image-related smart tag presentation process 140-2. In other words, the image-related smart tag presentation process 140-2 represents one or more portions or runtime instances of the image-related smart tag presentation application 140-1 performing or executing within or upon the processor 113 in the computer system 110 at runtime.

It is noted that example configurations disclosed herein include the image-related smart tag presentation application 140-1 itself including the image-related smart tag presentation process 140-2 (i.e., in the form of un-executed or non-performing logic instructions and/or data). The image-related smart tag presentation application 140-1 may be stored on a computer readable medium (such as a floppy disk), hard disk, electronic, magnetic, optical or other computer readable medium. The image-related smart tag presentation application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the image-related smart tag presentation application 140-1 in the processor 113 as the image-related smart tag presentation process 140-2. Those skilled in the art will understand that the computer system 110 may include other processes and/or software and hardware components, such as an operating system not shown in this example.

Figure 9:
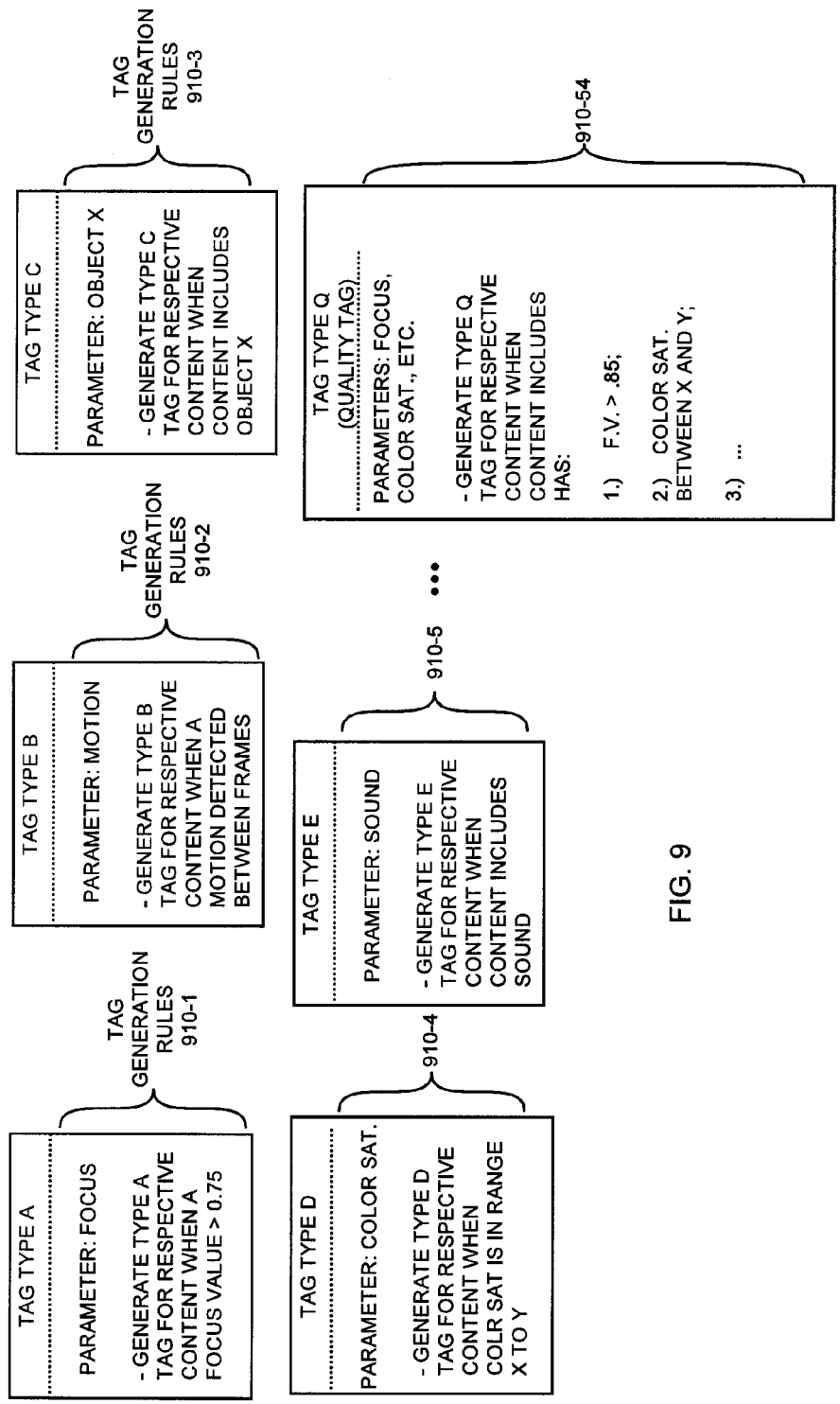
FIG. 9 illustrates examples of different types of tags, including a quality tag formed from a variety of tags according to embodiments described herein.

Examples of different types of tags and corresponding rules for generating the different types of tags are shown in FIG. 9. Each type of tag may be configured to create tags based on one or more different parameters related to the image content that the respective tag describes. For example, a type A tag may be a tag generated based on a focus parameter, a type B tag may be a tag generated based on a motion parameter, a type C tag may be a tag generated based on a parameter such as presence of an object in the respective image content, a type D tag may be a tag generated based on color saturation associated with the image content, and so on.

Each tag type also includes tag generation rules 910-N that describe the settings for parameters that result in the generation and application of that tag type. Tag generation rules 910-1, which are associated with type A tags as shown in FIG.

9, indicated that a type A tag is to be generated for respective content when the value of a focus parameter is greater than 0.75. Thus, when analyzing the metadata associated with a first portion of image content, if metadata for a corresponding portion of the image content indicates a focus level greater than 0.75, a type A tag will be generated and applied to the first portion. If only the fourth portion of the image content has metadata that indicates a focus level greater than 0.75, then only the fourth portion of the image content will be tagged with a type A tag. Any number of tags may be tagged with a type A if the tag application conditions or rules are met.

In some embodiments, different tag types may be combined to form a so-called super tag. A super tag includes a plurality of parameters instead of generation of a tag based on a single parameter. The super tag may be generated based on whether a respective portion of image content has been tagged with multiple tags. (Thus, a quality tag as described herein may be a super tag.) For example, if a respective portion of the image content is tagged with an in-focus tag, a good color saturation tag, etc., then a quality tag may be applied to the respective image portion to indicate that it is of high quality. Tagging multiple different sections of the image content based on selection of one or more tags in this way enables a user to find section of the image content of high quality. Display of the tags in a hierarchical tree enhances the ability of the user to manage the different type of tags.

In one embodiment, when analyzing the metadata associated with image content and applying different types of tags to the portions of image content, the metadata may be analyzed based on a first parameter to tag portions of the image content with a first tag type. As mentioned above, the metadata for corresponding portions of the image content may be generated based on analyzing how the images appear to a viewer when played back on a display screen. For example, an analyzer may perform an analysis of pixels in the image content to generate the metadata.

Referring to FIG. 9, as described above, a type A tag applies to image content where a focus value is greater than 0.75. If, for metadata of all frames inclusive between a first frame of image content and a hundredth frame of image content, and between a three hundredth frame of image content and a four hundredth frame of image content, a focus value of the metadata is greater than 0.75, then a type A tag will be generated and applied it to the first hundred frames of the image content (i.e., all frames inclusive between the first and the hundredth frame) and the fourth hundred frames (i.e., all frames inclusive between the three hundredth and the four hundredth frame).

The metadata may be analyzed based on a second parameter to tag portions of the image content with a second tag type. Referring again to FIG. 9, a type D tag applies to color saturation of the image content, and is generated when the color saturation of respective image content is within a given range X to Y (i.e., tag generation rules 910-4). Thus, the metadata is analyzed to find where the color saturation for portions of image content falls between the range X to Y. If the color saturation for the fiftieth frame to the hundred and fiftieth frame is between the range X to Y, then a type D tag will be created and applied to those frames (i.e., all frames inclusive between the fiftieth frame and the hundred and fiftieth frame).

The metadata may also be analyzed based on multiple parameters including the first parameter and the second parameter to tag portions of the image content with a third tag type. This third tag type may be a super tag such as a quality tag as mentioned above. For example, as shown in FIG. 9, a type Q tag (representing a super tag) includes, among other things, a focus parameter and a color saturation parameter. Tag generation rules 910-54 include generating a type Q tag when, among other things, a focus level is greater than 0.75 and when the color saturation is between a range X to Y. Thus, the metadata for the image content is analyzed to find those frames when both situations from the tag generation rules 910-54 apply. In the above example, the fiftieth to the hundredth frames (inclusive) of the image content include a focus level greater than 0.75 and have a color saturation falling within the range X to Y. Thus, in this example, a type Q tag will be generated and applied to the fiftieth to the hundredth frames (inclusive) of the image content.

As shown in FIG. 9, the tag generation rules 910 associated with a respective tag type are used to determine under what circumstances to apply the tags. For example, tag generation rules 910-1 specify when to generate a focus type tag or tag A associated with image content, tag generation rules 910-2 specify when to generate a motion type tag or tag B associated with image content, tag generation rules 910-3 specify when to generate a object type tag or tag C associated with image content, tag generation rules 910-4 specify when to generate a color saturation type tag or tag D associated with image content, tag generation rules 910-5 specify when to generate a sound type tag or tag E associated with image content, and so on.

The computer system 110 receives, through the I/O interface 114, image content 170 and a plurality of tags 175 (also referred to throughout as "smart tags") associated with the image content 170. The computer system 110 receives this data in response to a command received from the user 108 through the input device 116 (also connected to the I/O interface 114). In some embodiments, as shown in FIG. 1, the image content 170 and the plurality of tags 175 are provided from a source external to the computer system 110, such as a storage device 165. Alternatively, the image content 170 and/or the plurality of tags 175 may be stored within the computer system 110, such as in the memory unit 112 (not shown in FIG. 1). The image-related smart tag presentation process 140-2 receives the image content 170 and the plurality of tags 175 via the interconnect 111 and functions as described further herein to create a tag hierarchy 180. The tag hierarchy 180, along with the image content 170, is then passed via the I/O interface 114 to the display 130. The image-related smart tag presentation process 140-2 shows the tag hierarchy 180 in the graphical user interface 160 on the display 130, along with the image content 170 or a portion thereof.

Display of the tag hierarchy 180 and the image content 170 may, in some embodiments, be controlled by display manager 132 according to display settings 134. The display settings 134 may be set by the user 108, or may be provided by the computer system 110. For example, the memory unit 112 may include default display settings.

Note that the display 130 need not be coupled directly to computer system 110. For example, the image-related smart tag presentation application 140-1 may be executed on a remotely accessible computerized device via the network interface 115. In this instance, the graphical user interface 160 may be displayed locally to a user of the remote computer and execution of the processing herein may be client-server based.

Figure 2:
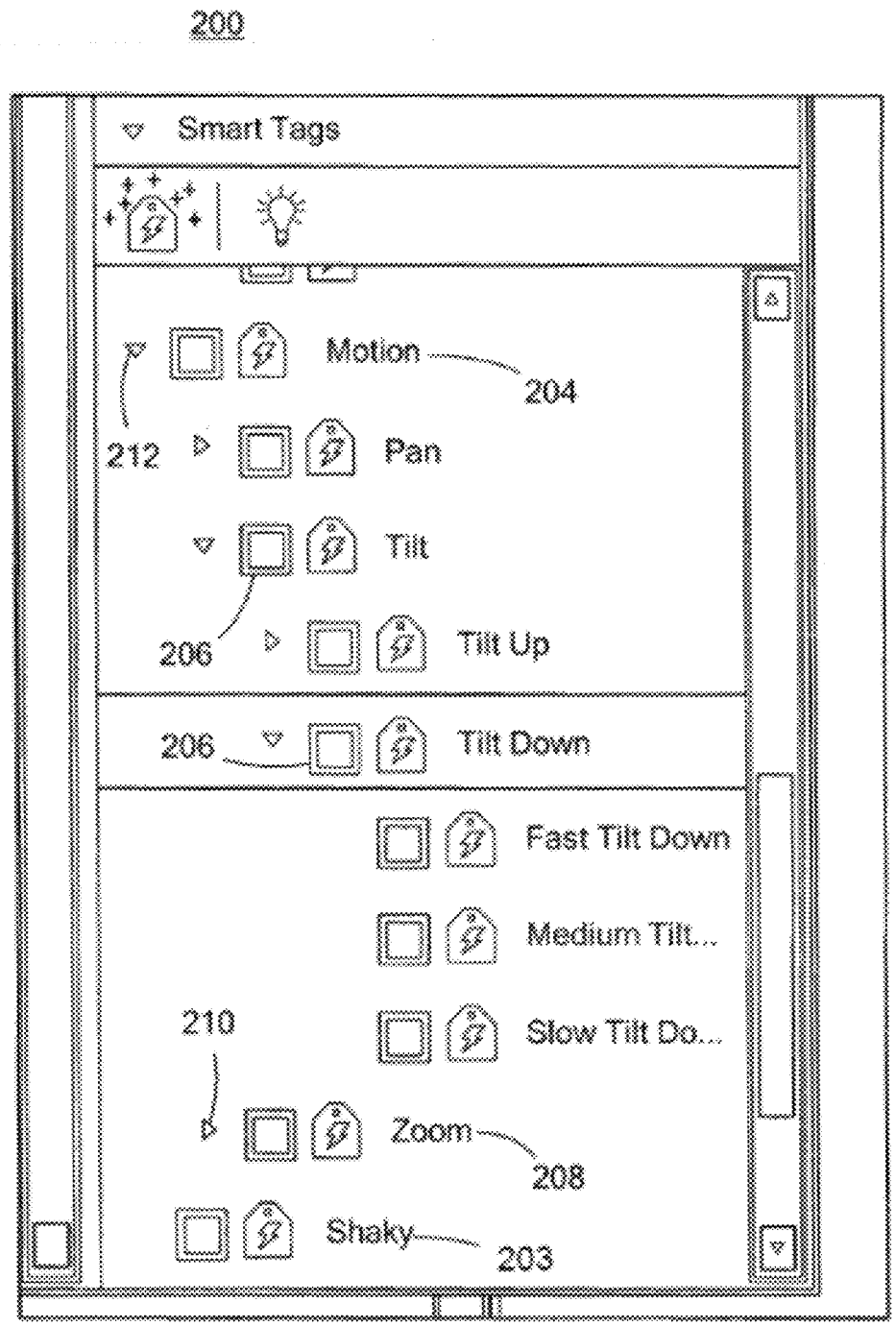
FIGS. 2-4 show example graphical user interfaces including hierarchies of smart tags and displayed image content according to embodiments described herein.
Figure 3:
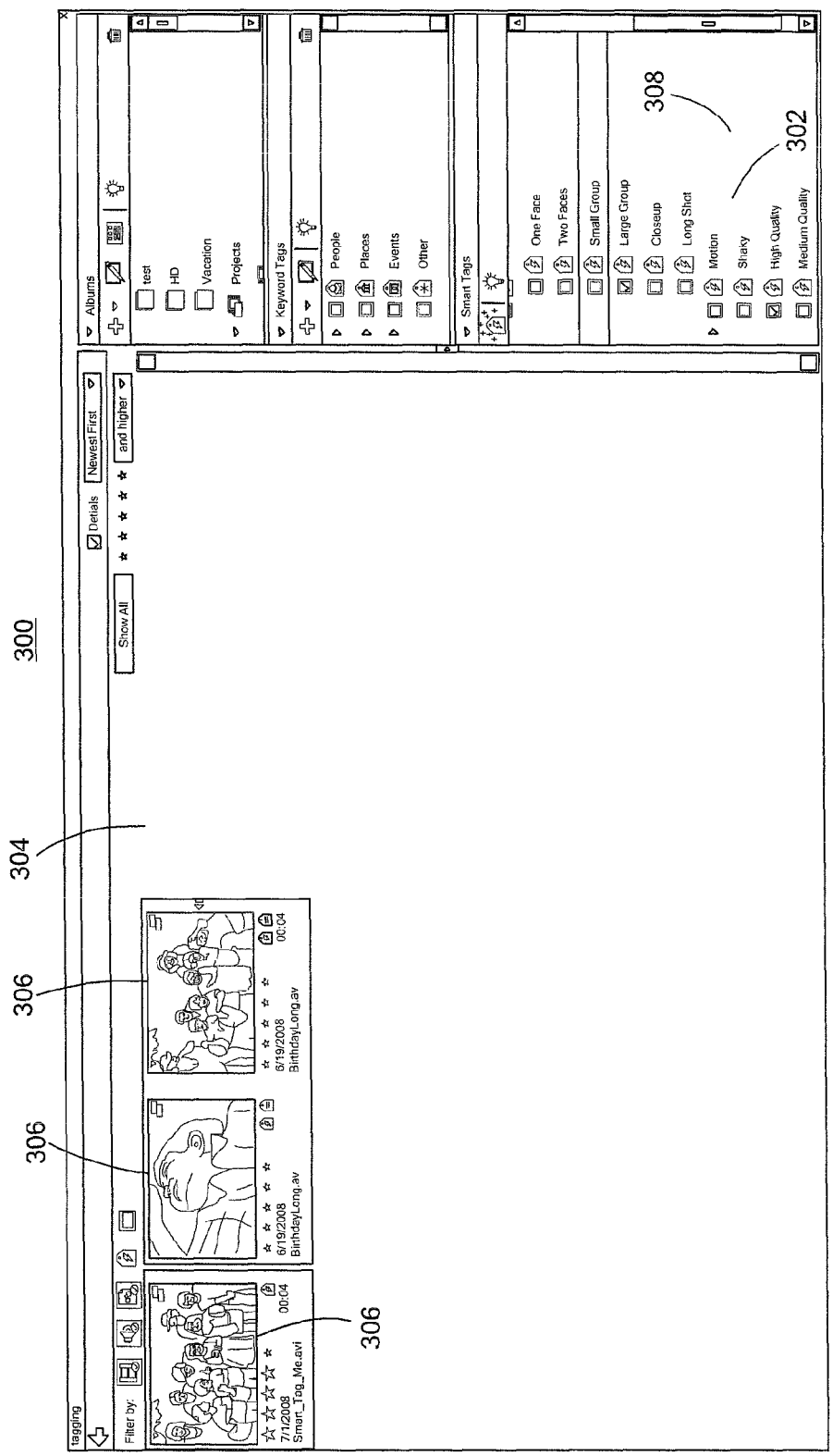
Figure 4:
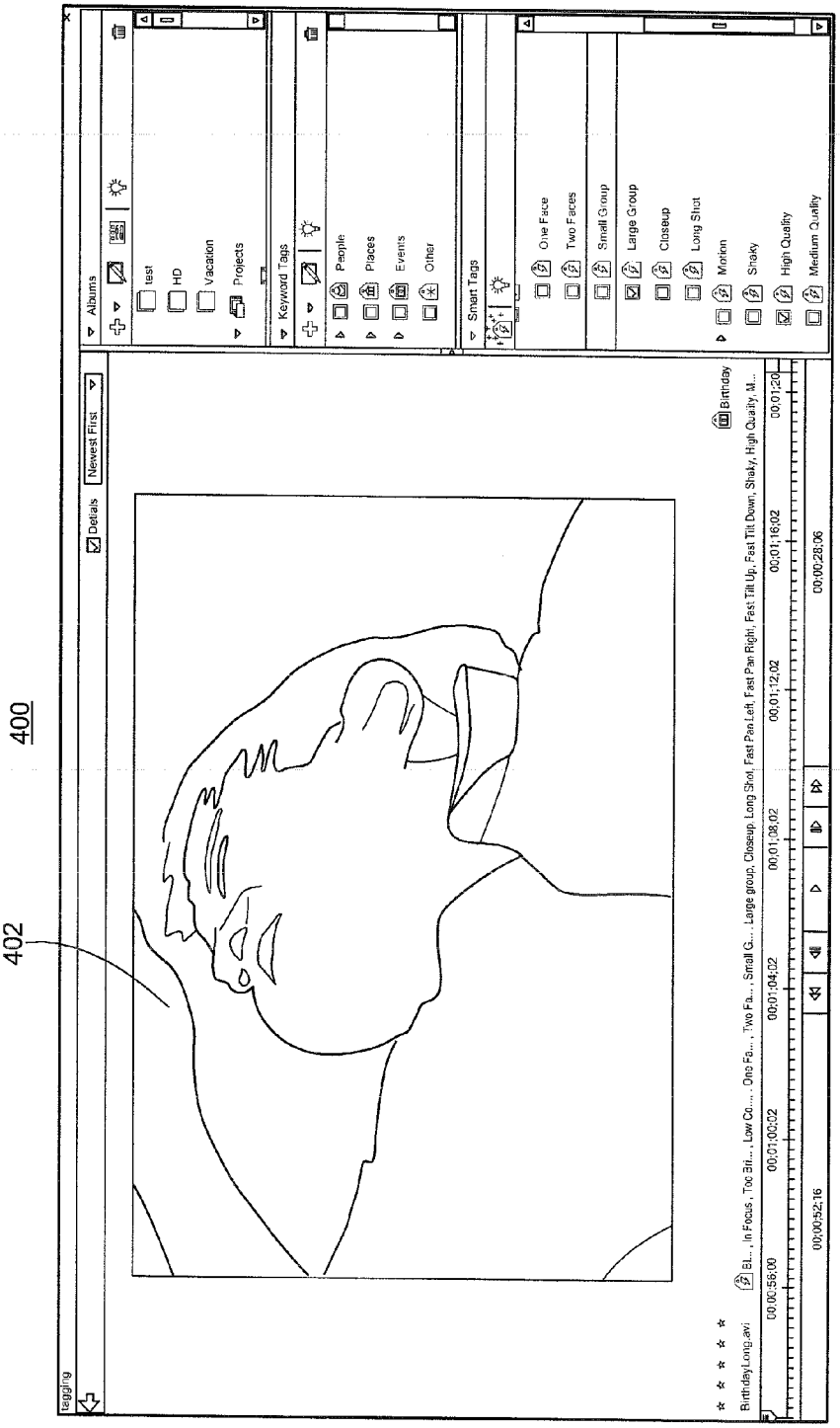

FIGS. 2-4 are examples various configurations of the graphical user interface 160, and are described in greater detail herein. FIG. 9 illustrates example of various tags as described in greater detail herein. FIGS. 10-13 are examples of displays of tags according to selections made from within a hierarchy of tags, as described in greater detail herein. FIGS. 5-8 and 14-15 are flowcharts of various embodiments of the image-related smart tag presentation process 140-2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 5A:
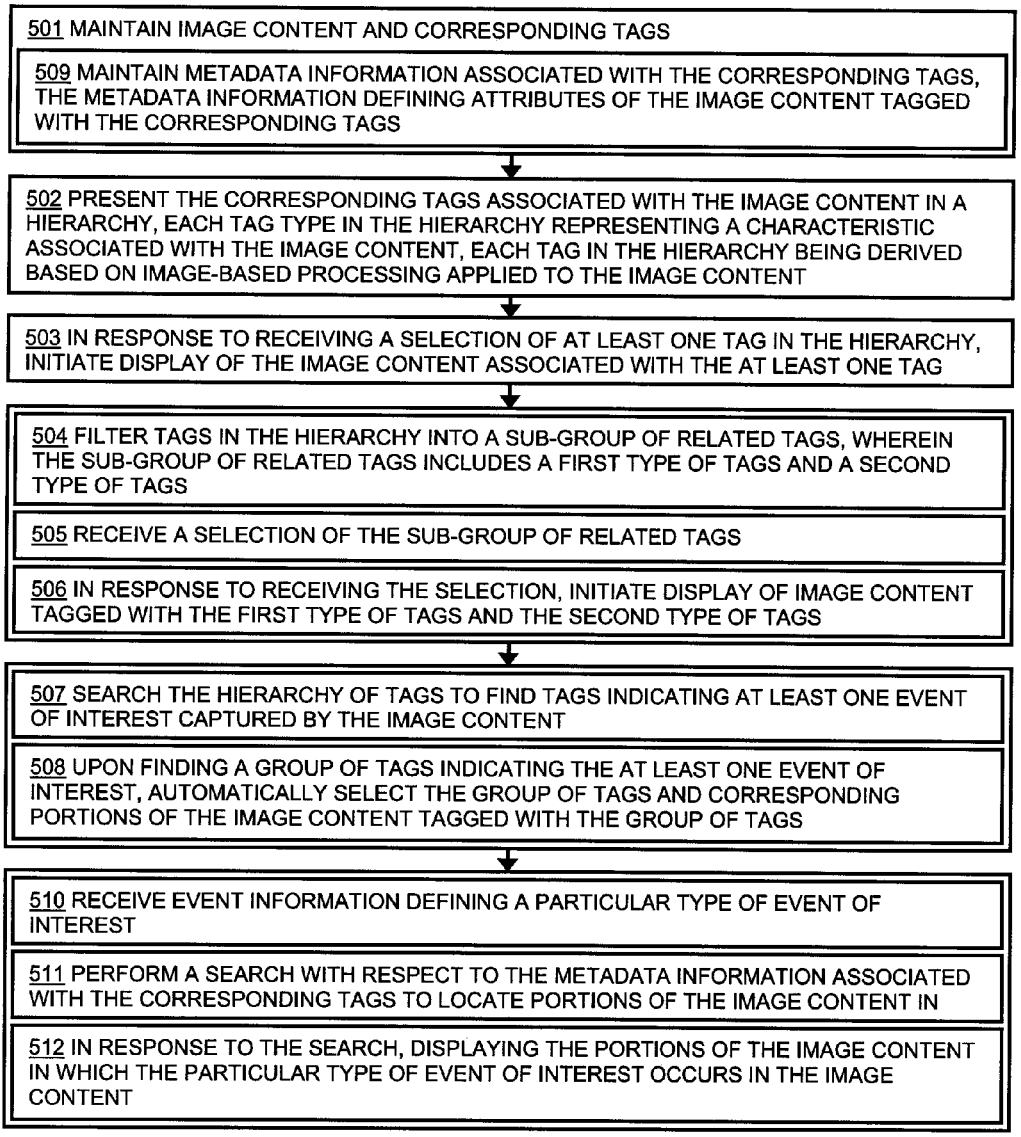
FIGS. 5A and 5B illustrate flowcharts of presenting a hierarchy of smart tags and finding image content by searching the hierarchy according to embodiments described herein.

FIG. 5 illustrates the image-related smart tag presentation application 140-1 executing as the image-related smart tag presentation process 140-2 to present a hierarchy of tags to a user, enabling the user to find image content of interest by using the hierarchy of tags. The image-related smart tag presentation process 140-2 first maintains image content and corresponding tags, step 501. The image-related smart tag presentation process 140-2 may maintain image content and corresponding tags in any number of way. For example, the image-related smart tag presentation process 140-2 may store image content and corresponding tags in a storage device, such as the memory until 112 shown in FIG. 4, or may otherwise be instructed to retrieve image content and corresponding tags via user input. Alternatively, a user may not need to take any actions beyond executing the image-related smart tag presentation application 140-1, which causes the image-related smart tag presentation process 140-2 to, according to pre-programming, scan one or more known storage locations for any and all image content and corresponding tags, and select everything it finds (or a subset of what it finds, according to any pre-programmed instructions). Of course, the image-related smart tag presentation process 140-2 may, upon initializing, prompt the user to select locations in which it should search for, and select, image content. Alternatively, or additionally, the image-related smart tag presentation process 140-2 may prompt the user for criteria in addition to the location in which to find and select image content. The image-related smart tag presentation process 140-2 then receives the selection after the selection is made, by the user or otherwise. In some embodiments, in addition to maintaining image content and corresponding tags, the image-related smart tag presentation process 140-2 may also maintain metadata information associated with the corresponding tags, step 509. The metadata information defines attributes of the image content tagged with the corresponding tags, as is described in greater detail herein.

The image-related smart tag presentation process 140-2 then presents the corresponding tags associated with the image content in a hierarchy, step 502. The hierarchy may be any arranging grouping of tags, and in a preferred embodiment, is a tree structure. Each top-level in the hierarchy represents a tag that is description of all of the other tags beneath it in the hierarchy. For example, under the motion tag 204 shown in FIG. 2 are tags for pan, zoom, and tilt. Each other sub-level tag that has one or more tags beneath it is similarly descriptive of the other tags in that sub-level. The tag data that resulted in image content being associated with a tag may be found in at least the level of the hierarchy containing that tag. Further, each tag includes the location of the image content (or portion of image content) associated with that tag, so that the image-related smart tag presentation process 140-2 is able to find that image content (or portion) upon selection of that tag. Each tag type in the hierarchy represents a characteristic associated with the image content. Each tag in the hierarchy is derived based on image-based processing applied to the image content. Thus, a characteristic may be something captured by the content (e.g., a group of people at a birthday party), or may be an image-related parameter (e.g., blurriness, brightness, zoom in, etc.), both as determined as a result of image-based processing of the image content.

An example of a portion of a hierarchy of tags 200 is shown in FIG. 2. A tag may be described in any known way, such as but not limited to by text, by one or more graphical elements, or by some combination thereof. Each entry in the hierarchy, whether an individual tag such as a shaky tag 203, or a group of tags such as a motion group tag 204, is selectable through use of a graphical element, such as checkboxes 206. The image-related smart tag presentation process 140-2 may present only the top-level entry for a group of tags, and hide the tags that form the group (such as a zoom tag 208). The image-related smart tag presentation process 140-2 then uses a graphical element, such as a right-facing arrow head 210, to indicate to a user that the zoom tag 208 is a group of tags, and that other tags may be found by expanding that level of the hierarchy. The image-related smart tag presentation process 140-2 may expand that level of the hierarchy, and present the tags contained therein, when, for example, a user selects the right-facing arrow head 210, causing it to rotate ninety degrees clockwise (not shown). Thus, a down-facing arrow head (such as a down-facing arrow head 212 next to the motion group tag 204) may indicate that the image-related smart tag presentation process 140-2 is presenting tags within the motion group of tags.

In some embodiments, the hierarchy of tags may be so large (e.g., due to the presence of a large variety of tags associated with image content) that the image-related smart tag presentation process 140-2 is unable to present the entire hierarchy on a display device (such as the display 130 shown in FIG. 1) at the same time. The image-related smart tag presentation process 140-2 may use conventional techniques, such as scrollbars, to allow a user to view the hierarchy, albeit only one portion at a time. Alternatively, the image-related smart tag presentation process 140-2 may filter tags in the hierarchy into sub-groups of related tags, step 504, wherein the sub-group of related tags includes a first type of tags and a second type of tags as described herein. This allows, for example, a user to effectively hide tags, or groups of tags, otherwise present in the hierarchy of tags that the user is uninterested in. For example, the hierarchy of tags may include a group of tags that identifies the number of faces present in image content. If the user is not interested in finding image content based on the number of faces present in that image content, the user may instruct the image-related smart tag presentation process 140-2 to filter that group of tags out from the hierarchy. The resultant hierarchy of tags includes sub-groups of tags, which may be based on the original groups in the hierarchy as presented by the image-related smart tag presentation process 140-2. However, the resultant hierarchy does not include the filtered out tag(s) (here, the number of faces group of tag). Note that a sub-group of tags, created by the image-related smart tag presentation process 140-2 as a result of filtering, may include one or more further sub-groups of further related tags, or may include a sole individual tag. When the image-related smart tag presentation process 140-2 then receives a selection of a sub-group of related tags, step 505, in response, the image-related smart tag presentation process 140-2 initiates display of image content tagged with the first type of tags and the second type of tags, step 506. Thus, a user is able to quickly and easily find tags in the hierarchy, and use those tags to find desired image content, without having to scroll through all of the levels of the hierarchy, and without having to view any of the image content.

After the image-related smart tag presentation process 140-2 receives a selection of at least one tag in the hierarchy, in response, the image-related smart tag presentation process 140-2 initiates display of the image content associated with the at least one tag, step 503. For example, in a graphical user interface 300 shown in FIG. 3, a user is able to select at least one (and thus possibly more than one) tag in a hierarchy of tags 302. The result is that the image-related smart tag presentation process 140-2 initiates display, in a display region 304 of the graphical user interface 300, image content 306 associated with those selected tags. The image content may, as is described in greater detail herein, by displayed in any number of ways. The image-related smart tag presentation process 140-2 may also display the selected tags in any known way. For example, the image-related smart tag presentation process 140-2 may arrange the presentation of the hierarchy (e.g., close down certain levels and open certain others, or filter out unneeded levels) so that all of the selected tags are shown simultaneously in a hierarchy display region 308. Alternatively, or additionally in some embodiments, the image-related smart tag presentation process 140-2 may place a list or other display of tags with each displayed portion of image content in the display region 304.

In some embodiments, instead of scrolling through the hierarchy of tags, and collapsing/expanding various levels in order to find particular tags, a user may desire to search the hierarchy of tags. A user may initiate a search with the image-related smart tag presentation process 140-2 in any number of ways, such as but not limited to selecting a search functionality command in the graphical user interface. The user must describe the tag or tags the user is searching for. The user may do this by describing an event that is of interest to the user (referred to throughout as an event of interest). An event of interest is simply an occurrence captured by the image-relate content. The occurrence may be shown though viewing of the image content (e.g., the number of people present in a portion of the image content), or may be an image-related parameter of the image content, as described herein. However a search is initiated, the image-related smart tag presentation process 140-2 searches the hierarchy of tags to find tags indicating at least one event of interest captured by the image content, step 507. Thus, if a user enters "'three people' outside 'birthday party' 'person with brown hair'" as a search, the image-related smart tag presentation process 140-2 will search the hierarchy of tags to find tags indicative of those search terms. Thus, the image-related smart tag presentation process 140-2 will try to find tags indicating image content including three people, outside scenes, scenes from a birthday party, and a person with brown hair. Of course, the image-related smart tag presentation process 140-2 may accept any Boolean search operators, such as but not limited to AND, OR, and NOT, so that a user is provide robust search queries to the image-related smart tag presentation process 140-2. The image-related smart tag presentation process 140-2, upon finding a group of tags indicating at least one event of interest, automatically selects the group of and displays the corresponding portions of image content tagged with the group of tags, step 508. Note that, in some embodiments, a group of tags may include only a single tag.

In some embodiments, a user may provide the image-related smart tag presentation process 140-2 with event information. Event information may be, but is not limited to, data that identifies what a user considers to be an event of interest. In some embodiments, event information may include a text-based description of the event of interest, such as "person standing in a room". In some embodiments, event information may include graphical data, such as an image, or short video clip, of a person's face, which the image-related smart tag presentation process 140-2 is to find, through image-based processing, within the image content. Any technique for providing the image-related smart tag presentation process 140-2 with a description of an event of interest may be used. Note that event information need not include the same terms as are present in any tags presented in the hierarchy of tags. Thus, the hierarchy of tags may include a group of tags labeled "faces", where a tag represents one or more particular people's faces or the number of total faces present in a portion of image content. These tags may be the only tags that represent whether or not a person is present in any portion of image content. If the user enters "person standing in a room" as event information, the image-related smart tag presentation process 140-2 will associate that event information with the one face tag, even though the terms "one", "face", and/or "one face" do not appear anywhere in the event information.

Figure 5B:
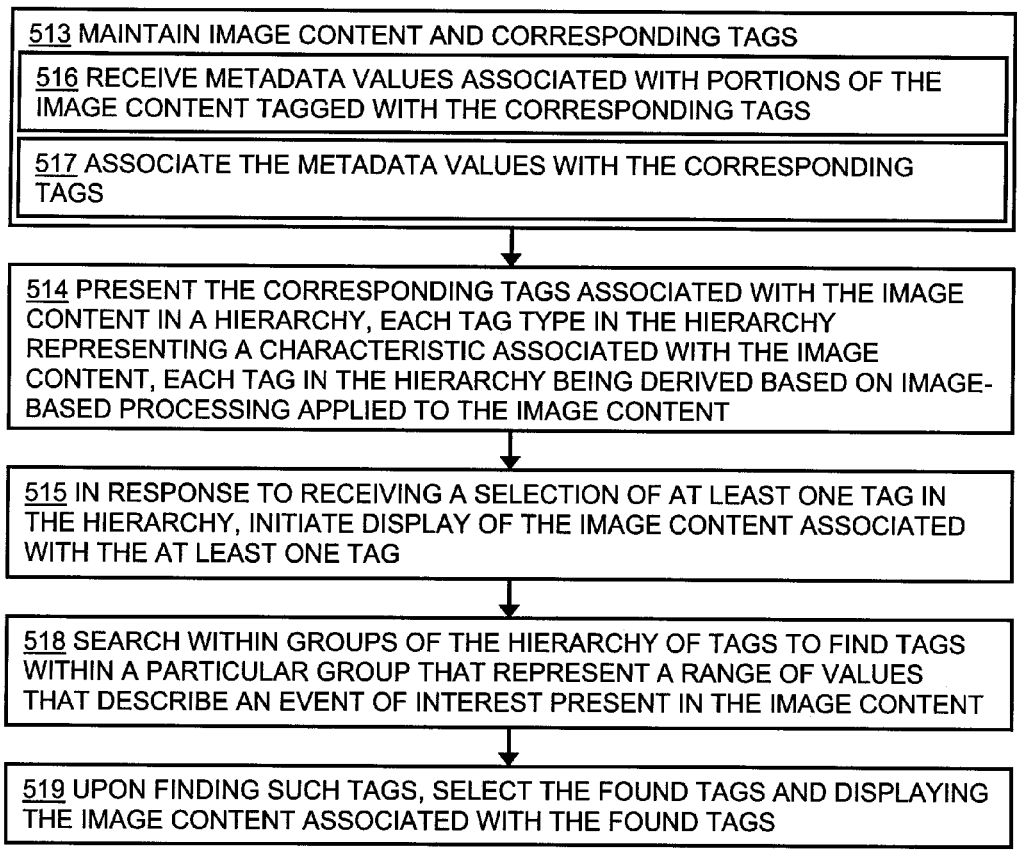

The image-related smart tag presentation process 140-2 then receives the event information defining a particular type of event of interest, step 510. When performing the search for tags related to the event of interest, the image-related smart tag presentation process 140-2 performs a search with respect to the metadata information associated with the corresponding tags to locate portions of the image content in which the particular type of event of interest occurs for image content tagged with the corresponding tags, step 511. In response, the image-related smart tag presentation process 140-2 displays the portions of the image content in which the particular type of event of interest occurs in the image content, step 512, as described herein. In FIG. 5B, the image-related smart tag presentation process 140-2 uses values stored within tags in the hierarchy to find image content. The image-related smart tag presentation process 140-2 maintains image content and corresponding tags, step 513. The image-related smart tag presentation process 140-2 then receives metadata values associated with portions of the image content tagged with the corresponding tags, step 516, and associates the metadata values with the corresponding tags, step 517. These values may include values for image-related parameters stored as metadata within tags, and may also include values present within the description of a tag (e.g., "three" from the label of a tag "three faces"). Thus, each tag may describes an image-related parameter of a portion of the image content as a value. An image-related parameter is a measurement determined by image-related processing, such as the blurriness (i.e., focus level), color balance, brightness, etc. of the image content. An image-related parameter may also include a measurement of a circumstance of the capturing of the image content, such as the amount of zoom in or out, panning in a direction, tilting in a direction, and so on. Note that an image-related parameter does not include a date/time stamp associated with the image content. The value is stored as metadata associated with the tag, and thus is accessible by the image-related smart tag presentation process 140-2 at the level of the hierarchy that includes that tag for searching and other operations. Further, in some embodiments, the image-related smart tag presentation process 140-2 may create one or more groups of tags in the hierarchy based on the metadata stored within the tags.

The image-related smart tag presentation process 140-2 then presents the corresponding tags associated with the image content in a hierarchy, step 514, each tag type in the hierarchy representing a characteristic associated with the image content, and each tag in the hierarchy being derived based on image-based processing applied to the image content, as described above. In response to receiving a selection of at least one tag in the hierarchy, the image-related smart tag presentation process 140-2 initiates display of the image content associated with the at least one tag, step 515. As an example, a user may desire to find image content where the brightness level of the image-related falls within a particular range of values, such as 0.2 to 0.5. The user may provide this range of values to the image-related smart tag presentation process 140-2 using any known techniques. The image-related smart tag presentation process 140-2 then searches within groups of the hierarchy of tags to find tags within a particular group that represent a range of values that describe an event of interest present in the image content associated with the tags, step 518. Alternatively, the user may desire to find image content where between two and six people appear in the image content. The user again provides this range of values to the image-related smart tag presentation process 140-2, which then searches the hierarchy to find tags that represent that range of values. When the image-related smart tag presentation process 140-2 finds tags corresponding to the desired range, the image-related smart tag presentation process 140-2 selects the found tags and displays the image content associated with the found tags, step 519, as otherwise described herein.

Figure 6:
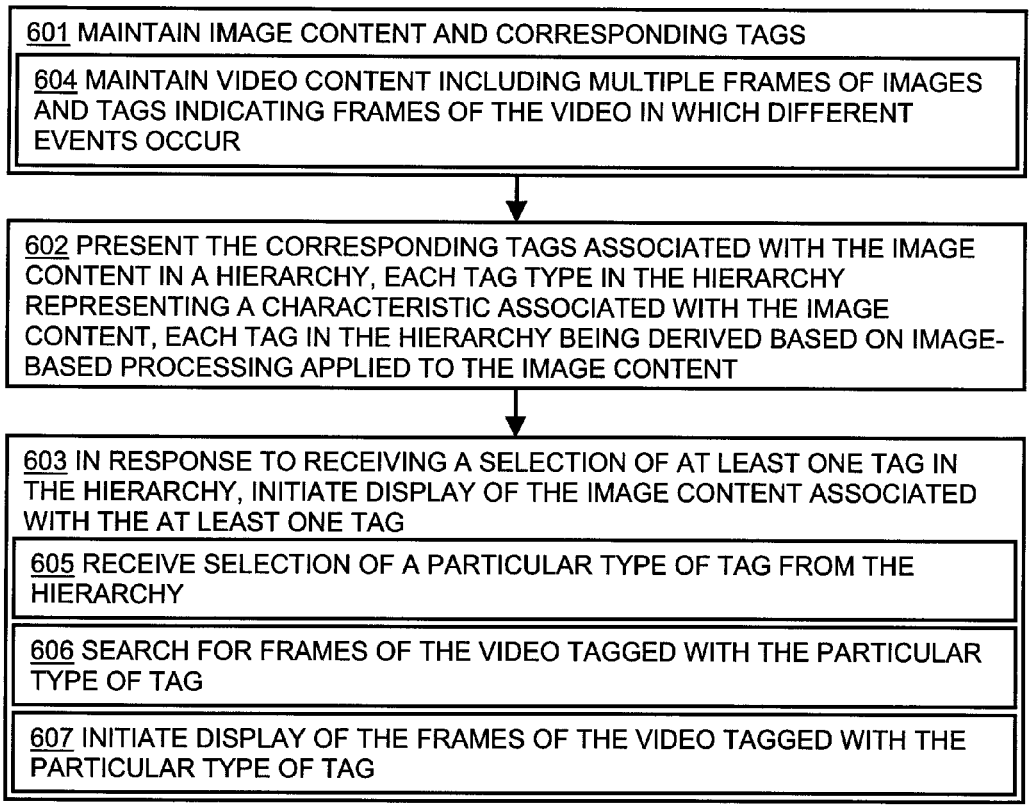
FIG. 6 illustrates a flowchart of searching a hierarchy of smart tags to find one or more portions of video according to embodiments described herein.

An embodiment in which the image-related smart tag presentation process 140-2 may be used to find a particular portion of a video is described in FIG. 6. The image-related smart tag presentation process 140-2 maintains image content and corresponding tags, step 601, as described above, but more particularly here, maintains video content including multiple frames of images and tags indicating frames of the video in which different events occur, step 604. The image-related smart tag presentation process 140-2 then presents the corresponding tags associated with the image content in a hierarchy, step 602. Each tag type in the hierarchy represents a characteristic associated with the image content, and each tag in the hierarchy is derived based on image-based processing applied to the image content. That is, a tag that is associated with a portion of image content identifies, for example, that the portion includes a group of three people, or a particular person's face, as determined by image-based processing. The hierarchy of tags is arranged as described above. A user then selects at least one tag in the hierarchy, for example, by placing a check mark in a check box corresponding to the at least one tag. The image-related smart tag presentation process 140-2 then receives the selection of at least one tag in the hierarchy, and in response, initiates display of the image content associated with the at least one tag, step 603. Here, the image-related smart tag presentation process 140-2 receives selection of a particular type of tag from the hierarchy, step 605, and searches for frames of the video tagged with the particular type of tag, step 606. Thus, a user may use any shown descriptions of tags within the hierarchy, or any other data contained within the hierarchy, such as metadata about an image-related parameter of a portion of the image content, to determine which tag or tags may lead to the desired video. After performing the search, the image-related smart tag presentation process 140-2 initiates display of the frames of the video tagged with the particular type of tag, step 607.

Figure 7:
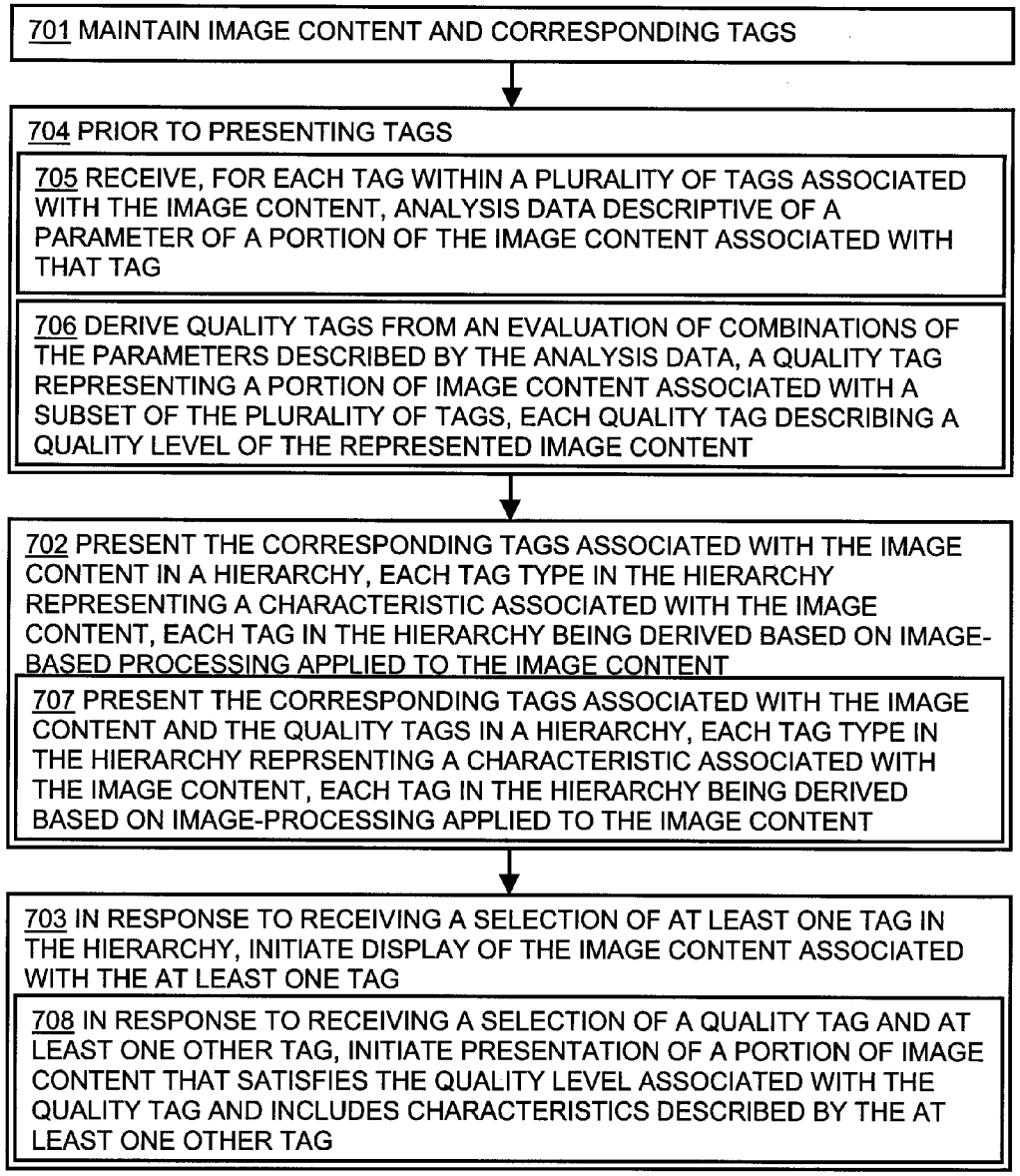
FIG. 7 illustrates a flowchart of receiving analysis data and creating quality tags therefrom as part of a hierarchy of smart tags according to embodiments described herein.

In FIG. 7, the image-related smart tag presentation process 140-2 receives analysis data describing one or more parameters of at least a portion of the image content, and derives quality tags from it, which are then placed into the tag hierarchy. First, as described herein, the image-related smart tag presentation process 140-2 maintains image content and corresponding tags, step 701. The image-related smart tag presentation process 140-2 then presents the corresponding tags associated with the image content in a hierarchy, step 702. Each tag type in the hierarchy represents a characteristic associated with the image content and each tag in the hierarchy is derived based on image-based processing applied to the image content. The hierarchy of tags may be arranged in any known way, including those described herein. A user (such as the user 108 shown in FIG. 1) then selects one or more tags in the hierarchy through any known selection techniques, such as but not limited to highlighting the tags with an input device (such as the input device 116 shown in FIG. 1) or placing check marks in check boxes associated with the desired tags (as shown in FIG. 2 or FIGS. 10-13). The image-related smart tag presentation process 140-2 receives the selection of the at least one tag, and in response, initiates display of the image content associated with the at least one tag, step 703.

Prior to the presenting tags associated with the image content, step 704, the image-related smart tag presentation process 140-2 may receive, for each tag within a plurality of tags associated with the image content, analysis data descriptive of a parameter of a portion of the image content associated with that tag, step 705. The analysis data may include, but is not limited to, values of image-related parameters as described above. The analysis data may further include, for example, the particular image-processing techniques and/or algorithms used to derive the analysis data.

The image-related smart tag presentation process 140-2 then derives quality tags from an evaluation of combinations of the parameters described by the analysis data, step 706. A quality tag represents a portion of image content associated with a subset of the plurality of tags. That is, each portion of image content that is associated with a quality tag is also associated with one or more tags presented by the image-related smart tag presentation process 140-2 in the hierarchy of tags. In a preferred embodiment, the quality tags include a high quality tag, a medium quality tag, and a low quality tag. Each quality tag describes a quality level of the represented image content. Thus, in a preferred embodiment, the high quality tag represents the highest quality level of the image content, the low quality tag represents the lowest quality level of the image content, and the medium quality tag represent a quality level in between the highest quality level and the lowest quality level. The requirements for each quality level may be chosen by a user, upon prompting by the image-related smart tag presentation process 140-2, or may be pre-programmed into the image-related smart tag presentation process 140-2, or may be determined by the image-related smart tag presentation process 140-2 based upon the analysis data for the image content.

The image-related smart tag presentation process 140-2 then presents tags associated with the image content and the quality tags in a hierarchy, step 707. As before, each tag type in the hierarchy represents a characteristic associated with the image content, and each tag in the hierarchy is derived based on image-based processing applied to the image content. Thus, a quality tag may describe, for example, that a five-second section of video is so blurry that it is considered by the image-related smart tag presentation process 140-2 to be low quality, or that a group of eight static images are so sharp in terms of color that they are considered by the image-related smart tag presentation process 140-2 to be high quality. The quality tags are in their own level of the hierarchy of tags, and this level may include how many ever different quality tags the image-related smart tag presentation process 140-2 created based upon the received analysis data. In some embodiments, the image-related smart tag presentation process 140-2 may use the analysis data to create sub-levels (and thus more tags) within one or more tags corresponding to one of the quality levels, dependent on different parameters. For example, to be considered high quality by the image-related smart tag presentation process 140-2 (and thus associated with the high-quality tag), image content may need (among other things) a brightness value above 0.80 and a blurriness value above 0.95. The brightness values of the image content associated with the high quality tag may be from 0.80 to 1.00, such that any portion of image content with a brightness value closer to 1.00 are better than those with a brightness value closer to 0.80. The image-related smart tag presentation process 140-2 may thus create tags underneath the high quality tag that allow a user to further select high quality images that also have certain brightness values (i.e., exactly 0.80, 0.90, 1.00, etc.) and/or brightness values within a range (e.g., between 0.80 and 0.85, 0.86 and 0.90, and so on). Finally, the image-related smart tag presentation process 140-2, in response to receiving a selection of a quality tag and at least one other tag, initiates presentation of a portion of image content that satisfies the quality level associated with the quality tag and includes characteristics described by the at least one other tag, step 708. Thus, if a user selects the three people tag, the high quality tag, and the outdoor tag, the only image content that the image-related smart tag presentation process 140-2 will show is image content that includes three people outdoors and is of high quality.

In some embodiments, the process by which smart tags are, generated may be designed using a plug-in architecture. Each plug-in may specify and perform a different respective analysis technique (i.e., image-based processing) with respect to the image content being analyzed. In an example embodiment, the smart tag generation process outputs metadata associated with the analyzed image content in a format such as Extensible Markup Language (XML. Via the plug-in architecture, smart tags may be generated based on multi-parameter analysis. Thus, quality tags as described above that are derived using the results of multiple analyses may, in some embodiments, ultimately be implemented by one or more respective plug-ins to carry out the associated analyses. For example, a smart tag generator process may be configured to produce a quality tag based on a brightness plug-in to analyze brightness associated with image content, a color contrast plug-in to analyze color contrasts associated with image content, and so on. In some embodiments, the smart tag generator process may be a part of the image-related smart tag presentation process 140-2, or may be a separate process capable of interfacing with the image-related smart tag presentation process 140-2. Alternatively, only the quality tag generation portion of the smart tag generator process may be a part of the image-related smart tag presentation process 140-2 or otherwise interface with the image-related smart tag presentation process 140-2.

Figure 8:
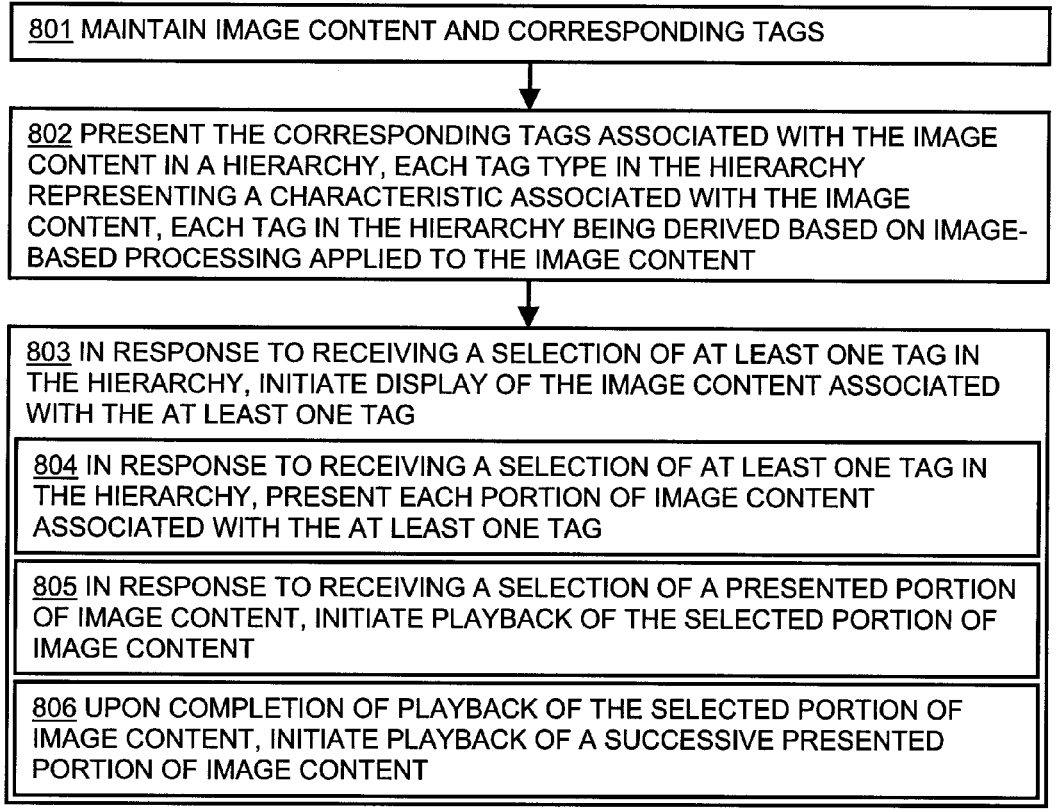
FIG. 8 illustrates a flowchart of playing image content found through a hierarchy of smart tags according to embodiments described herein.

FIG. 8 illustrates the image-related smart tag presentation process 140-2 playing image content found through the hierarchy of tags the image-related smart tag presentation process 1402 presents to a user. The image-related smart tag presentation process 140-2 first maintains image content and corresponding tags, step 801. The image-related smart tag presentation process 140-2 then presents the corresponding tags associated with the image content in a hierarchy, step 802, each tag type in the hierarchy representing a characteristic associated with the image content, each tag being derived based on image-based processing applied to the image content. In response to receiving a selection of at least one tag in the hierarchy, the image-related smart tag presentation process 140-2 initiates display of the image content associated with the at least one tag, step 803. Here, in response to receiving a selection of at least one tag in the hierarchy, the image-related smart tag presentation process 140-2 presents each portion of image content associated with the at least one tag, step 804. For example, if the image content is a video or a number of clips from a video, the image-related smart tag presentation process 140-2 may show a static image 402 (i.e., frame) of the video in a graphical user interface 400 shown in FIG. 4, and then may show another static image, and so on, or may show a preview of different portions of the video. Alternatively, the image-related smart tag presentation process 140-2 may show a series of static images such as the images 306 in FIG. 3, where each static image represents a frame of video or one of a series of static images (e.g., photographs).

However the image-related smart tag presentation process 140-2 presents the image content, a user may select one of the presented portions of image content using any known techniques. Then, in some embodiments, in response to receiving a selection of a presented portion of image content, the image-related smart tag presentation process 140-2 may initiate playback of the selected portion of image content, step 805. Thus, if the selected portion of image content is video, the image-related smart tag presentation process 140-2 begins playing the selected video. Alternatively, if the selected portion of image content is one or more static images, then the image-related smart tag presentation process 140-2 begins to show those images, either one at a time or groups of many at a time (i.e., a slideshow): Upon completion of playback of the selected portion of image content, the image-related smart tag presentation process 140-2 initiates playback of a successive presented portion of image content, step 806. Thus, the image-related smart tag presentation process 140-2 may begin playing the next video in a series of videos, or may begin showing the next image(s) in a series of images.

Figure 10:
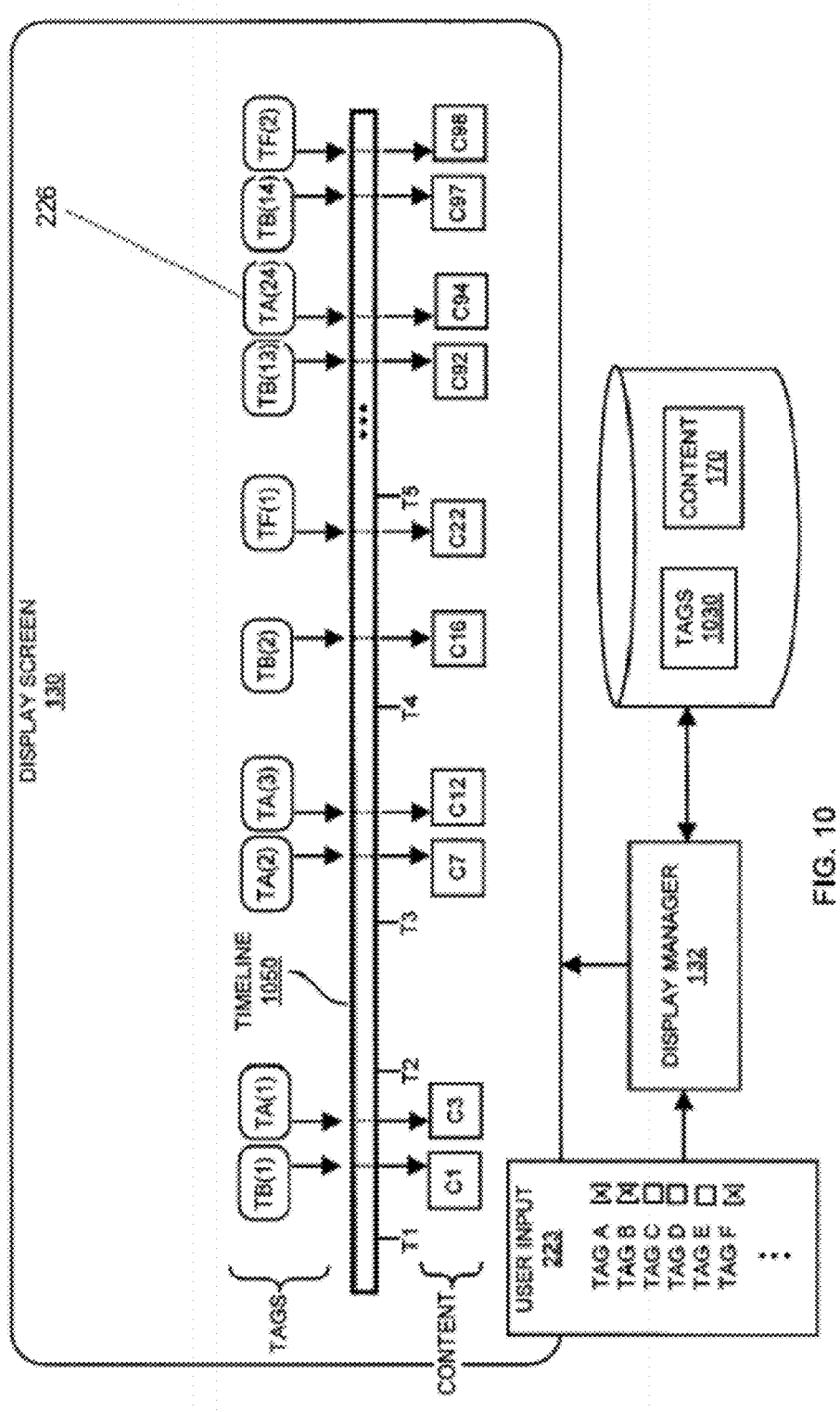
FIGS. 10-13 illustrates block diagrams of systems according to embodiments described herein where a plurality of tags are shown in a timeline dependent on a selection of tags from within a hierarchy.

In some embodiments, as shown in FIG. 10, the image-related smart tag presentation process 140-2 initiates display of different types of tags 1030 using a timeline 1050 presented to a user via a display screen 130. That is, the image-related smart tag presentation process 140-2 initiates display of a timeline 1050 associated with the image content 202. The timeline 1050 represents a sequence of time of the image content 202, but does not necessarily include any of the image content 202. The timeline 1050 may be populated with the different types of tags 1030 corresponding to the image content 202 to indicate relative times when different events occur in the image content 202.

For example, as shown in FIG. 10, the first instance of tag type B (TB(1)) may be a tag for detected motion in image content 170. Tag TB(1) is associated with content portion C1, which happens to be close in time to the first instance of tag type A (TA(1)), which may be a focus type tag associated with content portion C3. Similarly, the fourteenth instance of tag type B (TB(14)), a motion tag associated with content portion C97, occurs close in time to the second instance of tag type F (TF(2)), which indicates presence of a content portion 98 illustrating a small group of people. This allows a user viewing the display screen 130 to know, without viewing the image content 202 or any portion thereof, that the image content 202 includes motion events at the time identified by the first instance of tag type B and a well focused image as specified by the first instance of tag type A, and that the image content 202 includes a person's face as part of a small group of people around the time as identified by the second instance of tag type F.

Note that, according to one embodiment, the content C1, C3, C7, C12, C16, etc. may not initially be shown with respect to timeline 1050 even though tags TB(1), TA(1), TA(2), etc. may be shown in relation to timeline 1050. In such an embodiment, the viewer may comprehend the type of content associated with image content 170 without having to actually view the respective images, sound, etc. associated with content 170. The tagged portions of content such as C1, C3, C7, etc., may then be displayed in response to user input such as a selection of at least one tag in a hierarchy of tags, as shown as user input 223-1 in FIGS. 11-13 and described in greater detail in FIGS. 14 and 15 below.

Image-related smart tag presentation process 140-2 allows for selection of at least one tag, as described throughout. For example, as shown in FIG. 10, a hierarchy of tags A, B, C, D, E, F, . . . may be presented on the display screen 130 or otherwise provided to a user. The user is then able to select at least one of the tags, such as the tags A, B, and F selected as shown in FIG. 10. This user input 223 is then provided to the display manager 132.

In response to receiving the selection of a given tags (i.e., one of the tags A, B, and F), the image-related smart tagging process 140-2 initiates display of tag information associated with the given tag, the tag information providing an indication why the tag was created for the corresponding portion of the content image. That is, in response to receiving the selection of tag A via the user input 223, the image-related smart tagging process 140-2 shows tag information 226 on the display screen 130. The tag information 226 includes the type of tag (i.e., a type A tag), the content to which the tag is applied (i.e., content portion C94), the rule used to generate the tag, and the metadata derived from an analysis of the content portion C94 (i.e., F.V.=0.82), which caused the generation of the tag according to the rule. The image-related smart tagging process 140-2 would similarly display tag information for a type B tag and a type F tag as well, as these were also selected according to the user input 223.

Figure 14:
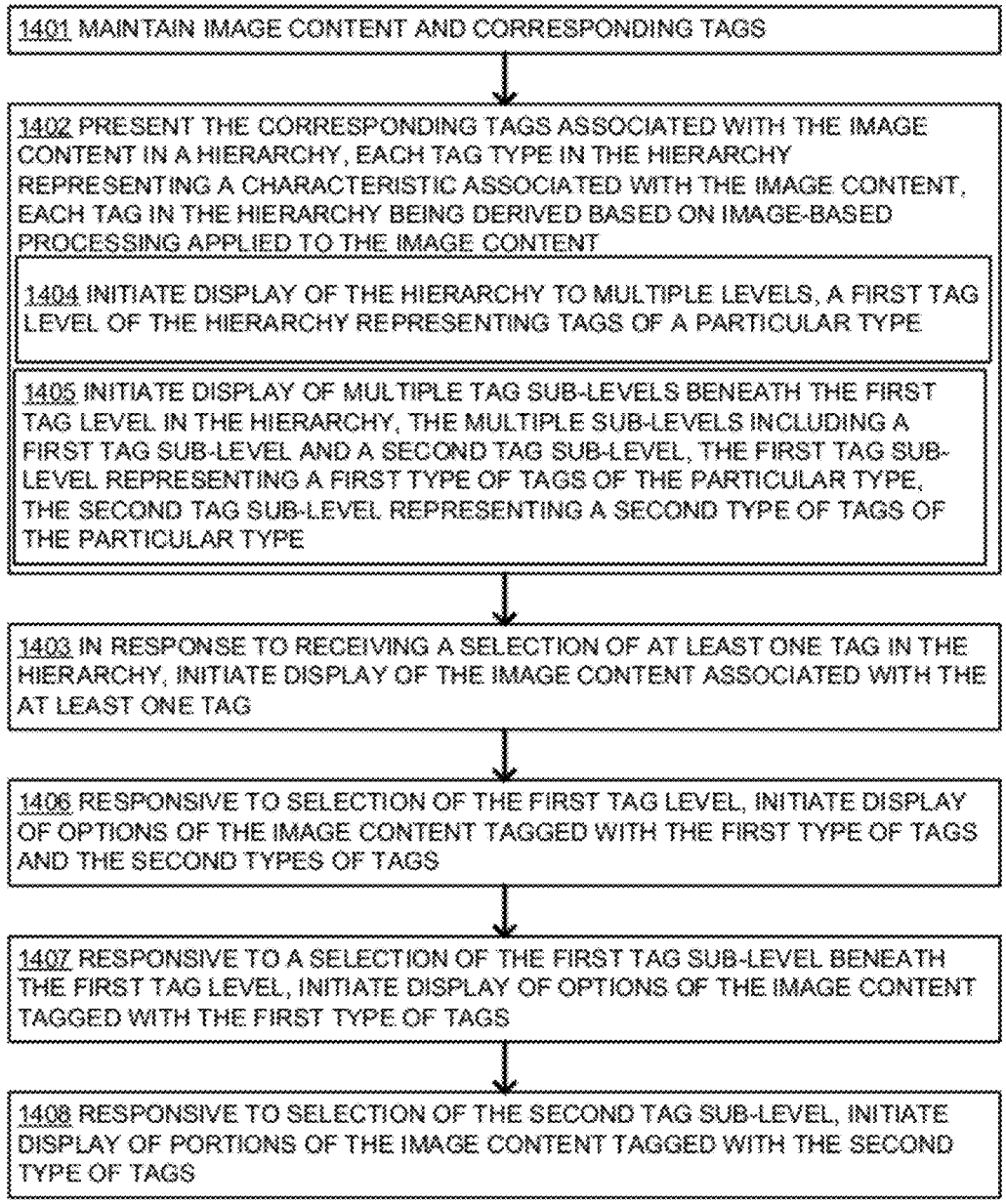
FIG. 14 illustrates a flowchart of tags being presented in a hierarchy and selections of those tags affecting display of tags and their associated image content on a display screen according to embodiments described herein.

FIG. 14 is an example flowchart describing navigation amongst tag hierarchy 180 and display of tag-related information according to embodiments herein. In accordance with FIG. 14, the image-related smart tag presentation process 140-2 displays multiple levels of a hierarchy of tags and allows for selection of tags in different levels of the hierarchy, resulting in the presentation of the corresponding image content. Thus, the image-related smart tag presentation process 140-2 maintains image content and corresponding tags, step 1401. The image-related smart tag presentation process 140-2 then presents the corresponding tags associated with the image content in a hierarchy, each tag type in the hierarchy representing a characteristic associated with the image content, each tag in the hierarchy being derived based on image-based processing applied to the image content, step 1402, as described herein. Here, the image-related smart tag presentation process 140-2 initiates display of the hierarchy to multiple levels, a first tag level of the hierarchy representing tags of a particular type, step 1404. Thus, as shown in tag hierarchy 180 of FIG. 11, tag type A represents tags of type A, tag type B represents tags of type B, and so on.

Figure 11:
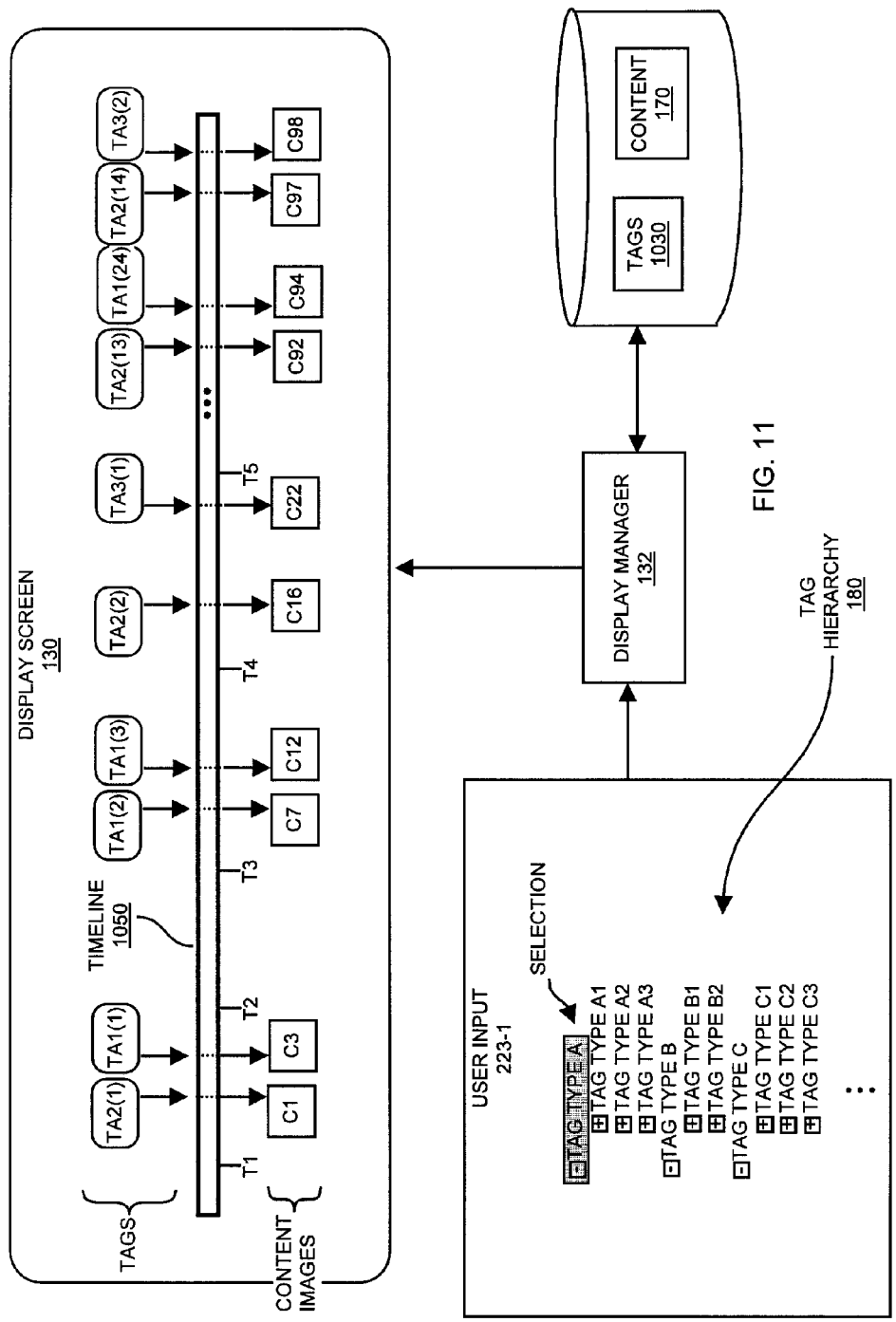

The image-related smart tag presentation process 140-2 also initiates display of multiple tag sub-levels beneath the first tag level in the hierarchy. For example, the multiple sub-levels of a first tag level may include a first tag sub-level and a second tag sub-level, the first tag sub-level representing a first type of tags of the particular type, the second tag sub-level representing a second type of tags of the particular type, step 1405. As an example, the tag type A resides at a first level in the hierarchical tree 180. The sub-levels associated with tag type A as in FIG. 11 are tag type A1, tag type A2, and tag type A3 under tag type A, and so on. The sub-levels associated with tag type B as in FIG. 11 are tag type B1 and tag type B2. The sub-levels associated with tag type C as in FIG. 11 are tag type C1, tag type C2, and tag type C3 under tag type A, and so on. Thus, each level of tags may be broken down into a sub-level of tags for the respective group. In response to receiving a selection of at least one tag in the hierarchy, the image-related smart tag presentation process 140-2 initiates display of the tags and/or image content associated with the at least one tag, step 1403, as discussed herein. Here, responsive to selection of the first tag level, the image-related smart tag presentation process 140-2 initiates display of portions of the image content tagged with the first type of tags and the second types of tags, step 1406. Thus, when tag type A is selected as shown in FIG. 11, the image-related smart tag presentation process 140-2 may be configured to show all type A tags (i.e., tag type A1, tag type A2, and tag type A3) in the display screen 130, as well as their corresponding image content.

Figure 12:
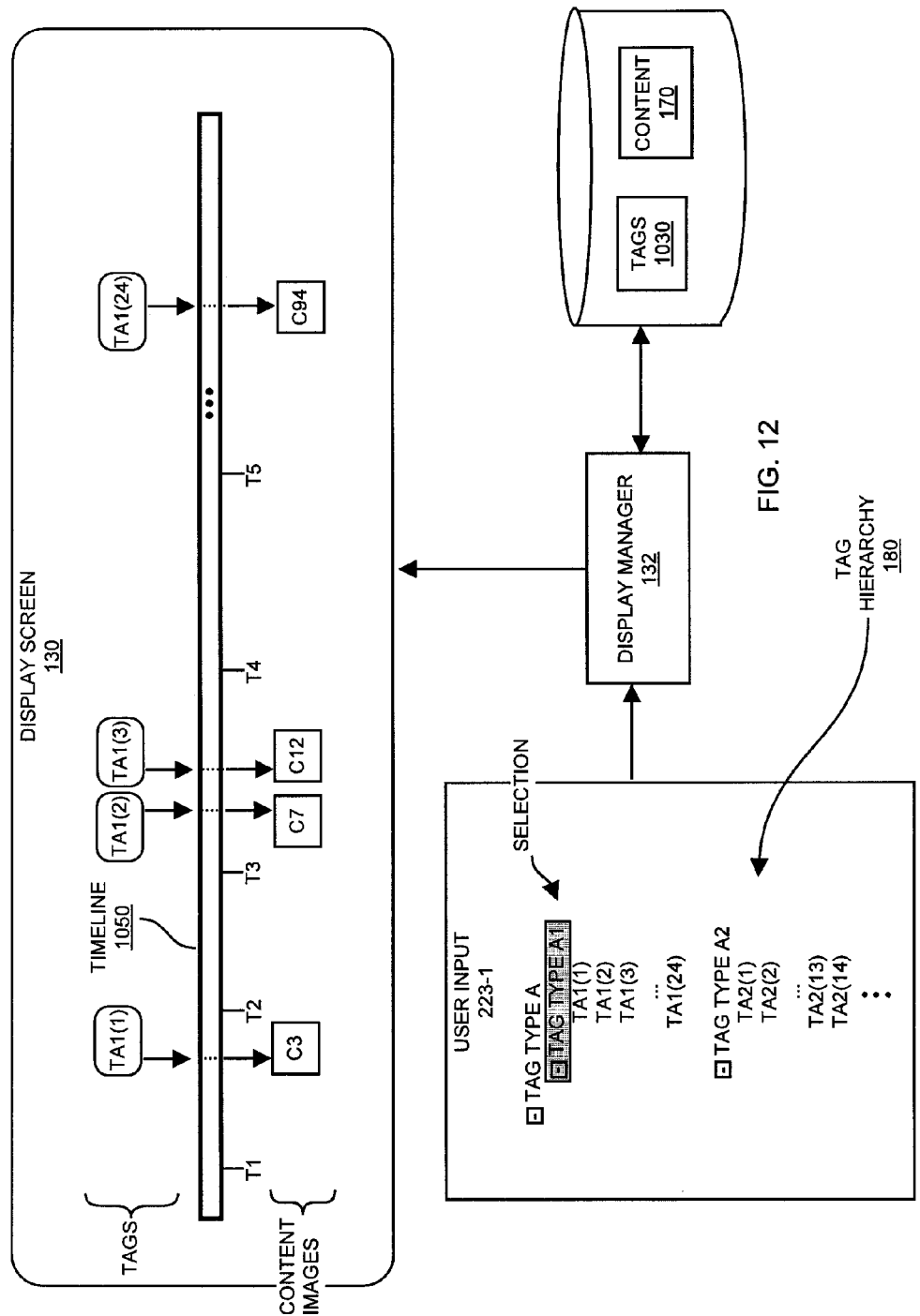

In step 1407, responsive to a selection of the first tag sub-level beneath the first tag level as shown in FIG. 12, the image-related smart tag presentation process 140-2 initiates display of portions of the image content tagged with the first type of tags such as tag type A1 because this is the level tags selected in the hierarchical tree 180. Thus, when the tag type A1 is selected from the tag hierarchy 180 as shown, in contrast to FIG. 11, the image-related smart tag presentation process 140-2 of FIG. 12 shows only tags of type A1. The display manager 132 may be configured to also display corresponding image content associated with only tag type A1 tags, and not all type A tags. Thus, tag type A2 tags and tag type A3 tags and their corresponding image content, shown in the display screen 130 of FIG. 11, are not present in the display screen 130 of FIG. 12. Accordingly, user may navigate amongst the tag hierarchy 180 to selectively control which tags are displayed on display screen 130. As mentioned above, the display manager 132 need not display the tagged content. In such an embodiment, the viewer may view the tags present in the timeline 1050 to get a sense of how often a particular type of content appears in the image content 170.

Figure 13:
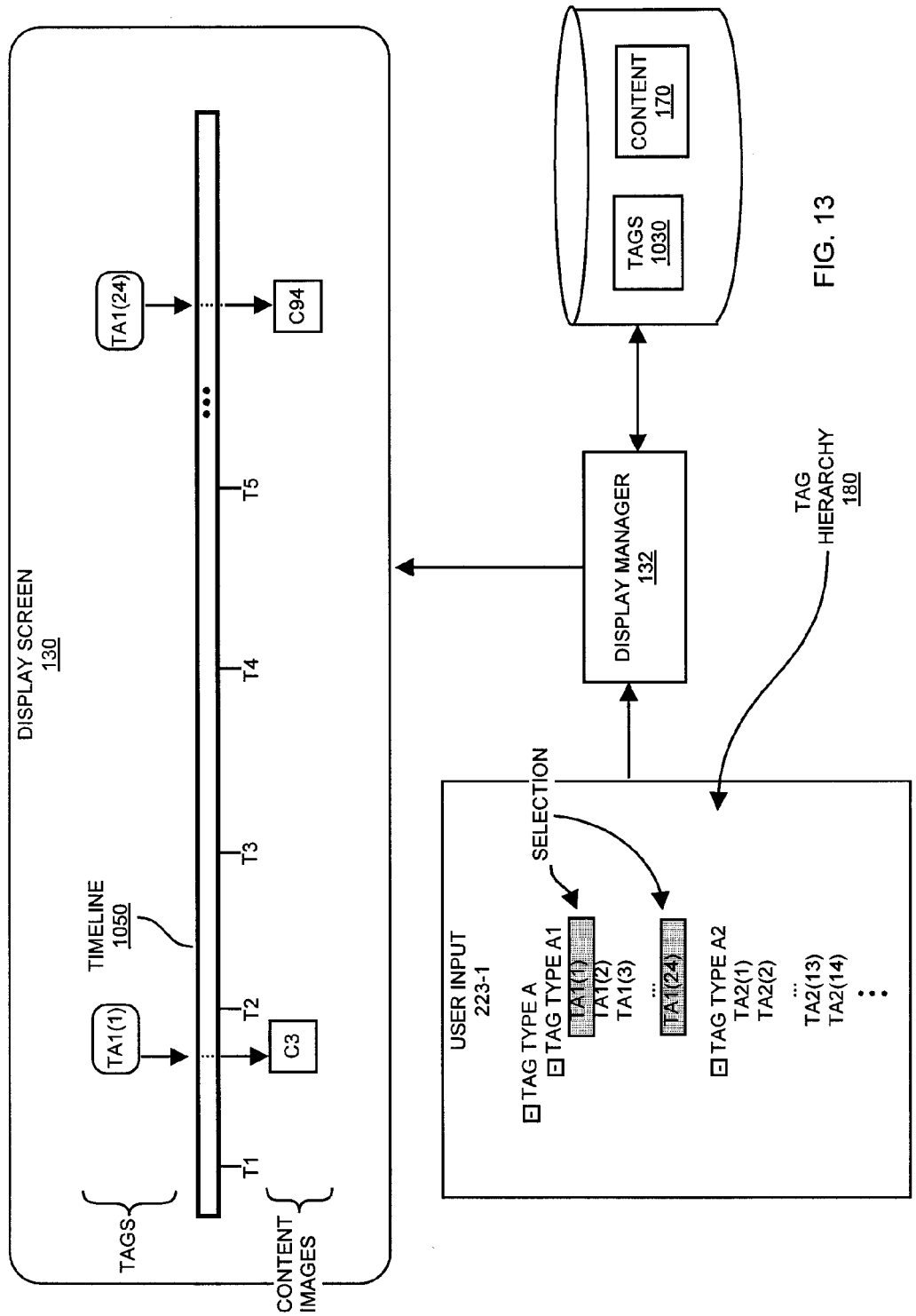

As shown in FIG. 13, the user may further navigate the tag hierarchy 180 to and select particular tags at any of multiple levels for viewing on the display screen. For example, as shown, a user may expand a folder in the tag hierarchy 180 and view resources at different levels such as an overall tag type at one level (folder for tag type A, folder for tag type B, etc.), sub folders of tag types in a given sub-level folder (folder tag type A1, tag type A2, tag type A3, etc.), and yet deep levels such as down to the individual tag level (TA(1), TA(2), TA(3), . . . ).

A user may further select at least one tag of tag type A1, as is shown in FIG. 13 and otherwise described throughout. Then, the image-related smart tag presentation process 140-2 shows only the selected tags in FIG. 13, namely tag A1(1) and tag A1 (4), as well as their corresponding image content.

If it any time a user selected one of the other tag levels shown in the tag hierarchy 180 of FIG. 10 (i.e., tag type B or tag type C), the image-related smart tag presentation process 140-2 would then display those type of tags and potentially their corresponding image content as well depending on a display configuration as a user may be only initially interested in viewing tags and not content. That is, responsive to selection of the second tag sub-level, the image-related smart tag presentation process 140-2 may initiates display of the second type of tags, and, if desired, portions of the image content tagged with second type of tags, step 1408.

As a further example as shown in FIG. 13, the user may change a selection to a higher level in the tag hierarchy 180. For example, a user may select the folder Tag Type A1. In such an instance, the display manager 132 would then initiate display of all tags TA1(1), TA1(2), TA1(3), . . . TA1(24) at appropriate positions on timeline 1050 to show relative times when the different events corresponding to the tags occurred in the image content 170.

As another example, a user may select the folder Tag Type A at yet a higher level in the tag hierarchy 180. In such an instance, the display manager 132 would then initiate display of all tags TA2(1), TA2(2), . . . , TA2(13), TA2(14), etc. at appropriate positions on timeline 1050 to show relative times when the different events corresponding to the tags occurred in the image content 170.

Thus, embodiments herein include responsive to selection of a first tag level, initiating display of tag symbols on a respective timeline associated with the image content. For example, assume that the Tag Type A folder is selected. The tag symbols shown in relation to timeline 1050 represent tags in the tag hierarchy 180 beneath the selected first tag level (Tag Type A) including tags (tag TA1(1), TA1(2), . . . ) beneath a first tag sub-level (Tag Type A1) and tags (tag TA2(1), TA2(2), . . . ) beneath a second tag sub-level (Tag Type A2).

Note that the selection in tag hierarchy may be marked with a distinctive display attributes such that a viewer may identify which of portion of the tag hierarchy 180 has been selected for viewing corresponding tags. In one embodiment, the display manager 132 may display the tags with a similar color as a respective color used to highlight the selection from the tag hierarchy 180.

In yet further embodiments, note that a respective viewer may select multiple tag folders in the tag hierarchy 180 for viewing of different types of tagged content. For example, the display manager 132 may highlight selected folders with different colors and match the color of the folder selection with the color of tags on the timeline 1050.

More specifically, a user may select both tag type A folder and tag type B folder. Responsive to such input, the display manager 132 may be configured to highlight the selected tag type A folder in the tag hierarchy 180 with orange highlighting as well as display the corresponding type A tags on timeline with orange highlighting. The display manager 132 may be configured to highlight the selected tag type B folder in the tag hierarchy 180 with green highlighting as well as display the corresponding type B tags on timeline with green highlighting. Thus, for each selection, the display manager 132 may use a different color so that a user may select a tag type form the hierarchy and easily identify a corresponding distribution of the selected tag type on timeline 1050. The different colored highlighting enables a respective viewer to distinguish the tag distributions based on color (or other type of highlighting such as shading or hatching if so desired.

Figure 15:
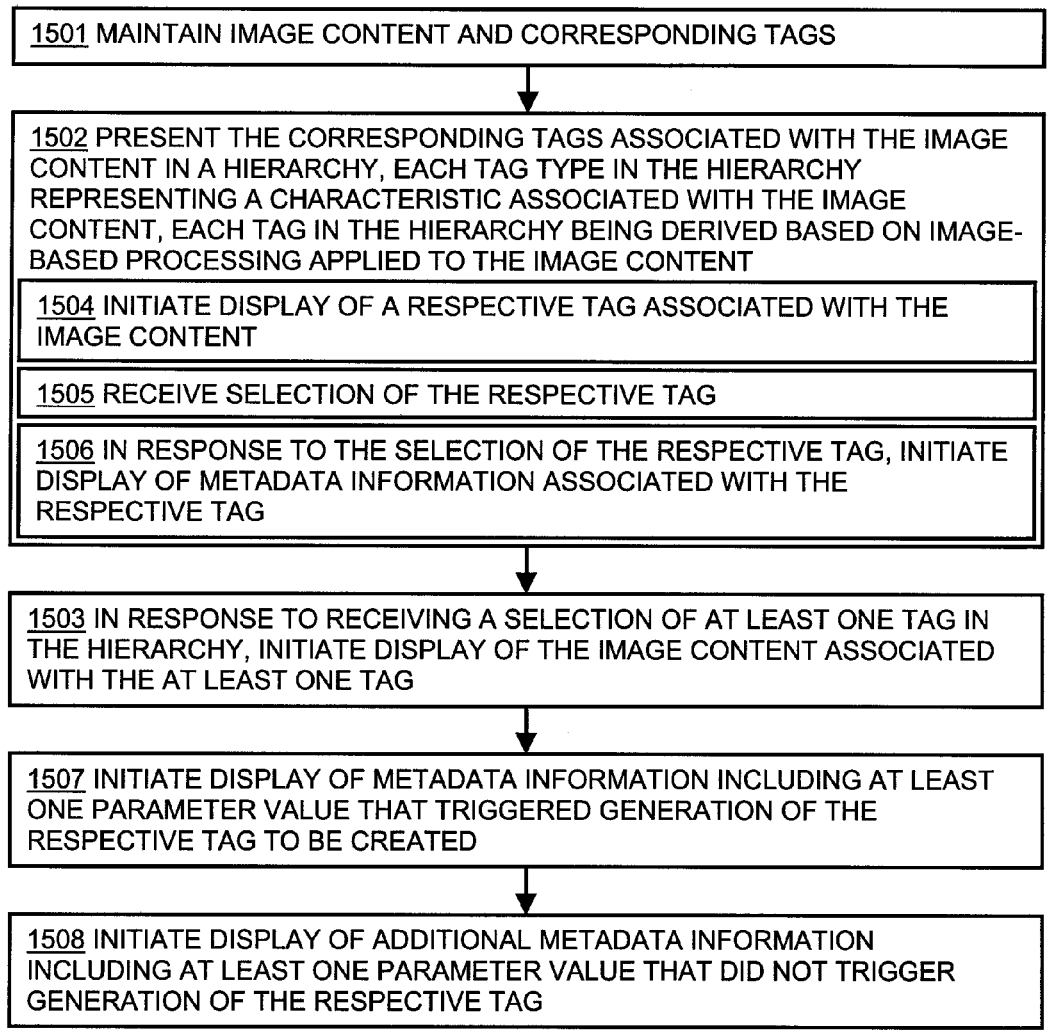
FIG. 15 illustrates a flowchart of displaying metadata information according to embodiments described herein.

FIG. 15 is an example flowchart illustrating navigation amongst a tag hierarchy 180 and display of tag-related information such as metadata according to embodiments herein. FIG. 15 illustrates the image-related smart tag presentation process 140-2 displaying the metadata and other information underlying a tag. The image-related smart tag presentation process 140-2 maintains image content and corresponding tags, step 1501. The image-related smart tag presentation process 140-2 then presents the corresponding tags associated with the image content in a hierarchy, step 1502, each tag type in the hierarchy representing a characteristic associated with the image content, each tag in the hierarchy being derived based on image-based processing applied to the image content, as described herein. In response to receiving a selection of at least one tag in the hierarchy, the image-related smart tag presentation process 140-2 initiates display of the image content associated with the at least one tag, step 1503. Here, the image-related smart tag presentation process 140-2 initiates display of a respective tag associated with the image content, step 1504. Thus, as shown in FIG. 10, instance twenty four of a type-A tag (i.e., TA(24)) is shown on the display screen 130. The image-related smart tag presentation process 140-2 then receives selection of the respective tag, step 1505, and in response, initiates display of metadata information associated with the respective tag, step 1506. The metadata information may be tag information 226 shown in FIG. 10. Thus, the metadata information may include, but is not limited to, a tag type, the corresponding image content portion, a rule for generating the tag, and a value used by the rule to create the tag. In other words, the image-related smart tag presentation process 140-2 may initiate display of metadata information including at least one parameter value that triggered generation of the respective tag to be created, step 1507, which would be the F.V. (i.e., focus value) of 0.82. In some embodiments, the image-related smart tag presentation process 140-2 may initiate display of additional metadata information including at least one parameter value that did not trigger generation of the respective tag, step 1508 (not shown in FIG. 10).

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix®, Oracle®) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Those skilled in the art may make many additional changes in the details, materials, and arrangement of parts, herein described and illustrated.

What is claimed is:

1. A method comprising:
receiving, by a processor, analysis data descriptive of at least two quality parameters of image content;
determining, by the processor, quality tags for the image content based on the analysis data, wherein the quality tag identifies a portion of image content having a quality level, wherein the quality level is based on each of the at least two quality parameters having a respective value that is within a respective range;
presenting, by the processor, a plurality of tags associated with the image content in a hierarchy, wherein the plurality of tags comprises the quality tags and at least one additional tag, each additional tag type in the hierarchy representing a characteristic associated with the image content, each additional tag in the hierarchy being derived based on image-based processing applied to the image content; and
in response to receiving a selection of at least one tag in the hierarchy, initiating, by the processor, display of the image content associated with the at least one tag.

2. The method of claim 1 further comprising:
filtering, by the processor, the plurality of tags in the hierarchy into a sub-group of related tags, wherein the sub-group of related tags includes a first type of tags and a second type of tags;
receiving, by the processor, a selection of the sub-group of related tags; and
in response to receiving the selection, initiating, by the processor, display of image content tagged with the first type of tags and the second type of tags.

3. The method of claim 1 further comprising:
searching, by the processor, the hierarchy of tags to find tags indicating at least one event of interest captured by the image content; and
upon finding a group of tags indicating the at least one event of interest, automatically selecting, by the processor, the group of tags and corresponding portions of the image content tagged with the group of tags.

4. The method of claim 1, further comprising:
receiving, by the processor, event information defining a particular type of event of interest;
performing, by the processor, a search with respect to metadata information associated with the plurality of tags to locate portions of the image content in which the particular type of event of interest occurs for image content tagged with the plurality of tags; and
based on the search, displaying, by the processor, the portions of the image content in which the particular type of event of interest occurs in the image content.

5. The method of claim 1, wherein receiving the selection includes receiving a selection of a particular type of tag from the hierarchy;
and wherein initiating display of the image content includes:
identifying frames of a portion of image content comprising video content tagged with the particular type of tag; and
initiating display of only the frames of the video content tagged with the particular type of tag.

6. The method of claim 1, further comprising:
receiving metadata values associated with portions of the image content tagged with the plurality of tags; and
associating the metadata values with the plurality of tags.

7. The method of claim 6 further comprising:
searching, by the processor, within groups of the hierarchy of tags to find tags within a particular group that represent a range of values that describe an event of interest present in the image content associated with the tags; and
upon finding such tags, selecting, by the processor, the found tags and displaying the image content associated with the found tags.

8. The method of claim 1 wherein initiating display comprises:
in response to receiving a selection of a quality tag and at least one other tag, initiating presentation of a portion of image content that satisfies the quality level associated with the quality tag and includes characteristics described by the at least one other tag.

9. The method of claim 1 wherein initiating display comprises:
in response to receiving a selection of at least one tag in the hierarchy, presenting each portion of image content associated with the at least one tag;
in response to receiving a selection of a presented portion of image content, initiating playback of the selected portion of image content; and
upon completion of playback of the selected portion of image content, initiating playback of a successive presented portion of image content.

10. The method as in claim 1, wherein presenting the plurality of tags associated with the image content in the hierarchy further comprises:
initiating display of the hierarchy to multiple levels, a first tag level of the hierarchy representing tags of a particular type; and
initiating display of multiple tag sub-levels beneath the first tag level in the hierarchy, the multiple sub-levels including a first tag sub-level and a second tag sub-level, the first tag sub-level representing a first type of tags of the particular type, the second tag sub-level representing a second type of tags of the particular type.

11. The method as in claim 10 further comprising:
responsive to selection of the first tag level, initiating, by the processor, display of portions of the image content tagged with the first type of tags and the second types of tags; and
responsive to selection of the first tag sub-level beneath the first tag level, initiating, by the processor, display of portions of the image content tagged with the first type of tags; and
responsive to selection of the second tag sub-level, initiating, by the processor, display of portions of the image content tagged with the second type of tags.

12. The method as in claim 10 further comprising:
responsive to selection of the first tag level, initiating, by the processor, display of symbols on a respective timeline associated with the image content, the symbols representing tags in the hierarchy beneath the first tag level including tags beneath the first tag sub-level and tags beneath the second tag sub-level.

13. The method of claim 1 wherein presenting comprises:
initiating display of a respective tag associated with the image content;
receiving selection of the respective tag; and
in response to the selection of the respective tag, initiating display of metadata information associated with the respective tag.

14. The method as in claim 1 further comprising:
initiating, by the processor, display of metadata information including at least one parameter value that triggered generation of the respective tag to be created; and
initiating, by the processor, display of additional metadata information including at least one parameter value that did not trigger generation of the respective tag.

15. The method of claim 1, wherein receiving analysis data descriptive of at least two quality parameters of image content comprises receiving analysis data descriptive of at least two of focus, color saturation, blurriness, color adjustments, or brightness.

16. The method of claim 1, wherein a characteristic associated with the image content comprises at least one of a inclusion of a specified object in the image content, detection of motion between frames of the image content, or presence of sound associated with the image content.

17. A computer program product comprising a non-transitory computer-readable medium having instructions stored thereon for processing data information, such that the instructions, when carried out by a processing device, enable the processing device to perform operations of:
maintaining image content and corresponding tags;
receiving, for each tag within a plurality of tags associated with the image content, analysis data descriptive of a parameter of a portion of the image content associated with that tag;
deriving quality tags from an evaluation of combinations of the parameters described by the analysis data, a quality tag representing a portion of image content associated with a subset of the plurality of tags, each quality tag describing a quality level of the represented image content;
presenting the corresponding tags associated with the image content and the quality tags in a hierarchy, each tag type in the hierarchy representing a characteristic associated with the image content, each tag in the hierarchy being derived based on image-based processing applied to the image content and describing a characteristic of a portion of the image content; and
in response to receiving a selection of at least one tag in the hierarchy, initiating display of the image content associated with the at least one tag, wherein initiating display comprises initiating playback of a portion of image content associated with the at least one tag and, upon completion of playback of the first portion of image content, initiating playback of a successive portion of image content associated with the at least one tag.

18. The computer program product of claim 17 further comprising additional instructions that, when carried out by a processing device, enable the processing device to perform the additional operations of:
filtering tags in the hierarchy into a sub-group of related tags, wherein the sub-group of related tags includes a first type of tags and a second type of tags;
receiving a selection of the sub-group of related tags; and
in response to receiving the selection, initiating display of image content tagged with the first type of tags and the second type of tags.

19. The computer program product of claim 17, wherein maintaining the corresponding tags includes maintaining metadata information associated with the corresponding tags, the metadata information defining attributes of the image content tagged with the corresponding tags, the computer program product further comprising:

receiving event information defining a particular type of event of interest;

performing a search with respect to the metadata information associated with the corresponding tags to locate portions of the image content in which the particular type of event of interest occurs for image content tagged with the corresponding tags; and in response to the search, displaying the portions of the image content in which the particular type of event of interest occurs in the image content.

20. The computer program product of claim 17 where initiating display comprises:

in response to receiving a selection of a quality tag and at least one other tag, initiating presentation of a portion of image content that satisfies the quality level associated with the quality tag and includes characteristics described by the at least one other tag.

21. The computer program product as in claim 17, wherein presenting the corresponding tags associated with the image content in the hierarchy further comprises:

initiating display of the hierarchy to multiple levels, a first tag level of the hierarchy representing tags of a particular type; and initiating display of multiple tag sub-levels beneath the first tag level in the hierarchy, the multiple sub-levels including a first tag sub-level and a second tag sub-level, the first tag sub-level representing a first type of tags of the particular type, the second tag sub-level representing a second type of tags of the particular type.

22. The computer program product as in claim 21 further comprising additional instructions that, when carried out by a processing device, enable the processing device to perform the additional operations of:

responsive to selection of the first tag level, initiating display of portions of the image content tagged with the first type of tags and the second types of tags; and responsive to selection of the first tag sub-level beneath the first tag level, initiating display of portions of the image content tagged with the first type of tags; and responsive to selection of the second tag sub-level, initiating display of portions of the image content tagged with the second type of tags.

23. The computer program product of claim 17 wherein presenting comprises:

initiating display of a respective tag associated with the image content;

receiving selection of the respective tag; and in response to the selection of the respective tag, initiating display of metadata information associated with the respective tag.

24. A computer system comprising:

a processor;

a memory unit that stores instructions associated with an application executed by the processor;

a display; and an interconnect coupling the processor, the memory unit, and the display, enabling the computer system to execute the application and perform operations of:

receiving, by a processor, analysis data descriptive of at least two quality parameters of image content;

determining, by the processor, quality tags for the image content based on the analysis data, wherein the quality tag identifies a portion of image content having a quality level, wherein the quality level is based on each of the at least two quality parameters having a respective value that is within a respective range;

presenting a plurality of tags associated with the image content in a hierarchy, wherein the plurality of tags comprises the quality tags and at least one additional tag, each additional tag type in the hierarchy representing a characteristic associated with the image content, each additional tag in the hierarchy being derived based on image-based processing applied to the image content; and in response to receiving a selection of at least one tag in the hierarchy, initiating display of the image content associated with the at least one tag.

25. The computer system of claim 24 comprising:

filtering tags in the hierarchy into a sub-group of related tags, wherein the sub-group of related tags includes a first type of tags and a second type of tags;

receiving a selection of the sub-group of related tags; and in response to receiving the selection, initiating display of image content tagged with the first type of tags and the second type of tags.

26. The computer system of claim 24, the computer system configured to perform further operations comprising:

receiving event information defining a particular type of event of interest;

performing a search with respect to metadata information associated with the plurality of tags to locate portions of the image content in which the particular type of event of interest occurs for image content tagged with the plurality of tags; and in response to the search, displaying the portions of the image content in which the particular type of event of interest occurs in the image content.

27. The computer system of claim 24 where initiating display comprises:

in response to receiving a selection of a quality tag and at least one other tag, initiating presentation of a portion of image content that satisfies the quality level associated with the quality tag and includes characteristics described by the at least one other tag.

28. The computer system as in claim 24, wherein presenting the plurality of tags associated with the image content in the hierarchy further comprises:

initiating display of the hierarchy to multiple levels, a first tag level of the hierarchy representing tags of a particular type; and initiating display of multiple tag sub-levels beneath the first tag level in the hierarchy, the multiple sub-levels including a first tag sub-level and a second tag sub-level, the first tag sub-level representing a first type of tags of the particular type, the second tag sub-level representing a second type of tags of the particular type.

29. The computer system as in claim 28 configured to perform further operations comprising:

responsive to selection of the first tag level, initiating display of portions of the image content tagged with the first type of tags and the second types of tags; and responsive to selection of the first tag sub-level beneath the first tag level, initiating display of portions of the image content tagged with the first type of tags; and responsive to selection of the second tag sub-level, initiating display of portions of the image content tagged with the second type of tags.

30. The computer system of claim 24 wherein presenting comprises:
initiating display of a respective tag associated with the image content; receiving selection of the respective tag; and
in response to the selection of the respective tag, initiating display of metadata information associated with the respective tag.

* * * * *